United States Patent
Meyuhas

(10) Patent No.: US 11,659,494 B2
(45) Date of Patent: May 23, 2023

(54) DEVICES AND METHODS TO MINIMIZE TRANSMISSION ENERGY AND MAXIMIZE THROUGHPUT

(71) Applicant: Intel Corporation, Santa Clara, CA (US)

(72) Inventor: Gil Meyuhas, Tel-Aviv (IL)

(73) Assignee: INTEL CORPORATION, Santa Clara, CA (US)

( * ) Notice: Subject to any disclaimer, the term of this patent is extended or adjusted under 35 U.S.C. 154(b) by 51 days.

(21) Appl. No.: 17/482,468

(22) Filed: Sep. 23, 2021

(65) Prior Publication Data
US 2022/0201622 A1    Jun. 23, 2022

(30) Foreign Application Priority Data
Dec. 23, 2020   (EP) ..................................... 20216911

(51) Int. Cl.
*H04W 52/24*   (2009.01)
(52) U.S. Cl.
CPC ................................ *H04W 52/241* (2013.01)
(58) Field of Classification Search
CPC ............. H04W 52/241; H04W 52/146; H04W 52/262; H04W 52/267; H04W 52/367
See application file for complete search history.

(56) References Cited

U.S. PATENT DOCUMENTS

| | | | |
|---|---|---|---|
| 8,989,792 B1* | 3/2015 | Depew .................. | H04B 1/3838 455/575.4 |
| 2012/0021800 A1 | 1/2012 | Wilson | |
| 2016/0098053 A1* | 4/2016 | Khawand ............ | H04W 52/362 307/116 |
| 2017/0041867 A1 | 2/2017 | Itagaki | |

FOREIGN PATENT DOCUMENTS

EP    2900021 A1    7/2015

OTHER PUBLICATIONS

Gelenbe et al. ("Optimum Power Level for Communications with Interference", IEEE, 2013, 6 pages) (Year: 2016).*
Jiang et al. ("Transmit power setting based on dynamic SAR", https://www.tdcommons.org/dpubs_series/1882, 2019, 11 pages (Year: 2019).*
European Search report issued for the corresponding EP patent application No. EP 20216911, dated Jun. 11, 2021, 8 pages (for informational purposes only).

* cited by examiner

*Primary Examiner* — Quoc Thai N Vu
(74) *Attorney, Agent, or Firm* — Viering, Jentschura & Partner mbB

(57) ABSTRACT

Device and methods to receive an instruction to apply a requested power back-off (PBO) for transmitting a data packet at an adjusted transmission power adapted from a current transmission power; estimate a first energy quantity for transmitting the data packet based on the adjusted transmission power and a first estimated length of time for transmitting the data packet at the adjusted transmission power; determine the second transmission power that is greater than the adjusted transmission power and estimate a second energy quantity based on the second transmission power and a second estimated length of time for transmitting the data packet at the second transmission power, where the second energy quantity is less than the first energy quantity; and apply the second PBO based on the second transmission power for transmitting the data packet instead of applying the requested PBO.

20 Claims, 11 Drawing Sheets

DEVICES AND METHODS TO MINIMIZE TRANSMISSION ENERGY AND MAXIMIZE THROUGHPUT

CROSS-REFERENCE TO RELATED APPLICATION

This application claims priority under 35 U.S.C. § 119 to European Application No. 20 21 6911.6 filed on Dec. 23, 2020, which is herein incorporated by reference in its entirety.

TECHNICAL FIELD

Various aspects relate generally to wireless communications and radiation exposure transmit power control techniques.

BACKGROUND

New communication technologies, such as 5G New Radio (NR) and Wireless Local Area Networks (WLANs) such as Wi-Fi, utilize higher radio frequencies in the millimeter wave (mmWave) spectrum and may also utilize beamforming to improve throughput and reduce frequency with existing wireless systems. While these techniques provide many advantages, they may also increase radio frequency (RF) radiation in the environment, including to users. For example, when a device focuses high RF transmissions in a narrow direction, the resulting transmission may deliver elevated levels of radiation energy to a focused area. When this focused area is directed in the direction of the user, the device may deliver high levels of radiation to the user and the signal quality may also be significantly degraded. The amount of radiation energy emitted absorbed by a unit of mass of a user over time may be defined as the specific absorption rate (SAR).

Various regulators, including the Federal Communications Commission (FCC) and the International Commission on Non-Ionizing Radiation Protection (ICNIRP), and standardization bodies like the $3^{rd}$ Generation Partnership Project (3GPP) have introduced SAR measures that limit the amount of radiation that a device can deliver to users. In response, methods and devices that implement time-averaging SAR (TAS) mechanisms have been introduced to comply with these regulatory measures.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosure. In the following description, various aspects of the disclosure are described with reference to the following drawings, in which.

DESCRIPTION

Figure 1:
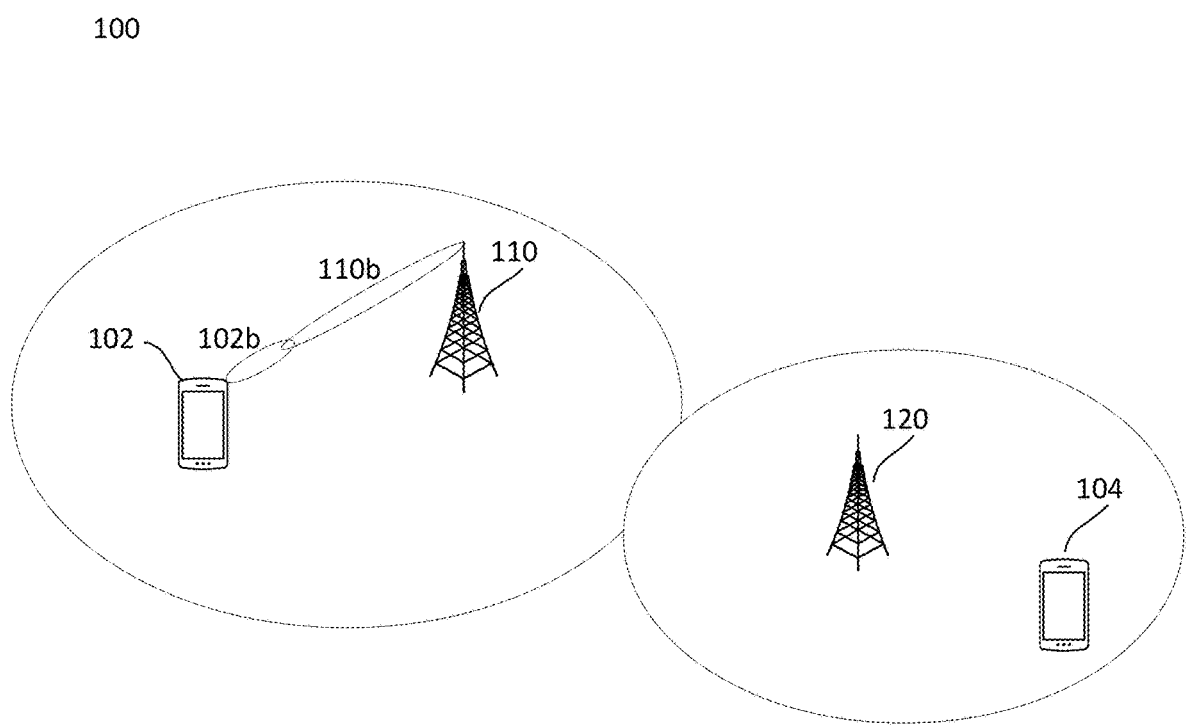
FIG. 1 exemplarily shows a radio communication network according to some aspects.

TAS mechanisms monitor the power used in device transmissions over a time period (e.g., an averaging window) in order to comply with SAR regulations issued by authorities or by standardization committees. TAS mechanisms may include implementing a transmission (Tx) energy budget available over the time period to ensure that transmission power SAR limits are not exceeded. In this manner, TAS mechanisms may compare the amount of spent energy to the TAS TX energy budget for the time window and control the Tx power accordingly. Devices may be configured to control the Tx power by applying a power back-off (PBO) that limits the Tx power to lower levels or by applying a time back-off (TBO) that prevents transmissions for a certain period of time.

TAS mechanisms and schemes aggregate power over this time period to regulate the total energy transmitted during the time period to comply with regulations set forth by governing bodies that are intended to limit the amount of radiation exposure to users. These TAS mechanisms compare the amount of spent energy, or the average spent energy, to a TAS energy budget available for the time period. If the energy budget is nearly spent, or within certain margins, TAS mechanisms may apply a back-off (BO) in the form of a PBO or a TBO. While each of these options has their share of advantages and disadvantages, such as differences in throughput, connection range, and latencies, TAS mechanisms are configured to decide between using each of the two options (PBO vs TBO) and/or determine whether to alternate or use a combination of the two.

However, when applying a PBO, the resulting decrease in transmission power may result in lowering the PHY rate due to the channel state of the communication channel, the range with the network access node, noise/interference levels, etc. So, while TAS mechanisms may decide to apply a PBO based on a Tx power history or a power integral of a moving average over a time window in order to comply with regulatory or standardization limits, applying such a PBO may actually cause the counter-effect that will cause the total energy to transmit the packet to be greater due to a longer time of transmitting the packet over the air (OTA). In other words, the reduced PHY rate will result in an OTA time that will be longer than the original OTA had a PBO not been applied in a manner that will result in the overall energy to transmit the packet to increase, and therefore, have the opposite effect of efficiently utilizing the available transmission energy budget. This transmission energy budget may be an amount of energy that is available for transmissions over a time window that may be defined by regulations or standards. In some aspects, this time window may be based on a geographic area (e.g., a country) and/or communication channel frequency band. For example, the time window may be in the range of 30 seconds, 60 seconds, 100 seconds, 6 minutes. The exact determination of the time window may depend on the geographic area (e.g., a country) and/or communication channel frequency band.

In some aspects, the methods and devices of this disclosure are configured to estimate a resulting PHY rate (i.e., a rPBOrate) based a requested PBO and, based on this estimated PHY rate, estimate an effect on the overall Tx energy of transmitting a data packet and determining whether instead to choose a second PBO different from the requested PBO that will result in a lower overall Tx energy of transmitting the same data packet. The lower overall Tx energy may be attributed to a shorter Tx over the air while keeping the delta of time to the origin packet time as a non-Tx time. By keeping the remaining portion of the packet time as a non-Tx portion, the overall throughput that the requested PBO would have induced remains relatively the same, albeit as a higher Tx power over a short Tx duration. The second PBO may, for example, be less than the requested PBO, i.e., the Tx power will be higher when the second PBO is applied as compared if the rPBO is applied. By applying the mechanisms described herein, the overall Tx energy budget may be spent more efficiently and the throughput of the data transmission at the second PBO will be higher compared to if the requested PBO had been applied. The methods and devices described herein, therefore, are configured to select a second PBO value that will not violate the TAS transmission energy budget and also consider future effects of the system, link quality, and OTA time.

TAS mechanisms may control or limit the Tx target power by applying a PBO to control the average transmission energy level, and the disclosure herein provides supplementary features to the TAS mechanisms that include additional calculations that estimate the predicted effect of the initial requested PBO on the overall energy to transmit a packet. Based on this estimation, the features of this disclosure allow for the ability to choose a second PBO based on a second transmission power that may be higher than the adjusted transmission power that would have been applied had the requested PBO been applied. Therefore, the devices and methods disclosed herein are able to achieve a higher throughput and optimize the TAS transmission energy budget more efficiently.

In some aspects, the methods and devices disclosed herein are configured to determine whether a second PBO (sPBO) may be applied instead of a requested PBO (rPBO) value requested by a TAS mechanism. The sPBO may be equal to or smaller than the rPBO, resulting in a higher Tx power during the time the sPBO is applied. The sPBO may be determined based on the use of a fixed rate knee point database (FRKD) and an estimation to search for and find a smaller sPBO value that results in an overall transmission energy per packet (for the same amount of packet data that the rPBO PHY rate would have transferred) being less than if the rPBO would been applied. Therefore, less transmission energy is used for the transmission of the data packet, while throughput is increased, connection range is extended, and latency is reduced.

The methods and devices of this disclosure provide numerous advantages, including, but not limited to: increasing Tx power with the allowed TAS transmission energy budget, using less Tx energy to communicate the same amount of data, maximizing Tx throughput, improving cell and spectral density of network cells by reducing time spent on transmission OTA, extending connection range, and reducing the link quality control time to stabilize into new rate when a PBO is applied, all while still complying with regulatory or standard SAR compliance limits.

The following detailed description refers to the accompanying drawings that show, by way of illustration, specific details and aspects in which the disclosure may be practiced.

The word "exemplary" is used herein to mean "serving as an example, instance, or illustration". Any aspect or design described herein as "exemplary" is not necessarily to be construed as preferred or advantageous over other aspects or designs.

The words "plurality" and "multiple" in the description or the claims expressly refer to a quantity greater than one. The terms "group (of)", "set [of]", "collection (of)", "series (of)", "sequence (of)", "grouping (of)", etc., and the like in the description or in the claims refer to a quantity equal to or greater than one, i.e. one or more. Any term expressed in plural form that does not expressly state "plurality" or "multiple" likewise refers to a quantity equal to or greater than one. The terms "proper subset", "reduced subset", and "lesser subset" refer to a subset of a set that is not equal to the set, i.e. a subset of a set that contains less elements than the set.

Any vector and/or matrix notation utilized herein is exemplary in nature and is employed solely for purposes of explanation. Accordingly, aspects of this disclosure accompanied by vector and/or matrix notation are not limited to being implemented solely using vectors and/or matrices, and that the associated processes and computations may be equivalently performed with respect to sets, sequences, groups, etc., of data, observations, information, signals, samples, symbols, elements, etc.

As used herein, "memory" is understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, registers, shift registers, processor registers, data buffers, etc., are also embraced herein by the term memory. A single component referred to as "memory" or "a memory" may be composed of more than one different type of memory, and thus may refer to a collective component including one or more types of memory. Any single memory component may be separated into multiple collectively equivalent memory components, and vice versa. Furthermore, while memory may be depicted as separate from one or more other components (such as in the drawings), memory may also be integrated with other components, such as on a common integrated chip or a controller with an embedded memory.

The term "software" refers to any type of executable instruction, including firmware.

The term "terminal device" utilized herein refers to user-side devices (both portable and fixed) that can connect to a core network and/or external data networks via a radio access network. "Terminal device" can include any mobile or immobile wireless communication device, including User Equipment (UEs), Mobile Stations (MSs), Stations (STAs), cellular phones, tablets, laptops, personal computers, wearables, multimedia playback and other handheld or body-mounted electronic devices, consumer/home/office/commercial appliances, vehicles, and any other electronic device capable of user-side wireless communications. Without loss of generality, in some cases terminal devices can also include application-layer components, such as application processors or other general processing components that are directed to functionality other than wireless communications. Terminal devices can optionally support wired communications in addition to wireless communications. Furthermore, terminal devices can include vehicular communication devices that function as terminal devices.

The term "network access node" as utilized herein refers to a network-side device that provides a radio access network with which terminal devices can connect and exchange information with a core network and/or external data networks through the network access node. "Network access nodes" can include any type of base station or access point, including macro base stations, micro base stations, NodeBs, evolved NodeBs (eNBs), Home base stations, Remote Radio Heads (RRHs), relay points, Wireless Local Area Network (WLAN) Access Points (APs), Bluetooth master devices, DSRC RSUs, terminal devices acting as network access nodes, and any other electronic device capable of network-side wireless communications, including both immobile and mobile devices (e.g., vehicular network access nodes, moving cells, and other movable network access nodes). As used herein, a "cell" in the context of telecommunications may be understood as a sector served by a network access node. Accordingly, a cell may be a set of geographically co-located antennas that correspond to a particular sectorization of a network access node. A network access node can thus serve one or more cells (or sectors), where the cells are characterized by distinct communication channels. Furthermore, the term "cell" may be utilized to refer to any of a macrocell, microcell, femtocell, picocell, etc. Certain communication devices can act as both terminal devices and network access nodes, such as a terminal device that provides network connectivity for other terminal devices.

Various aspects of this disclosure may utilize or be related to radio communication technologies. While some examples may refer to specific radio communication technologies, the examples provided herein may be similarly applied to various other radio communication technologies, both existing and not yet formulated, particularly in cases where such radio communication technologies share similar features as disclosed regarding the following examples. As used herein, a first radio communication technology may be different from a second radio communication technology if the first and second radio communication technologies are based on different communication standards.

Aspects described herein may use such radio communication technologies according to various spectrum management schemes, including, but not limited to, dedicated licensed spectrum, unlicensed spectrum, (licensed) shared spectrum (such as LSA, "Licensed Shared Access," in 2.3-2.4 GHz, 3.4-3.6 GHz, 3.6-3.8 GHz and further frequencies and SAS, "Spectrum Access System," in 3.55-3.7 GHz and further frequencies), and may be use various spectrum bands including, but not limited to, IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, etc., where some bands may be limited to specific region(s) and/or countries), IMT-advanced spectrum, IMT-2020 spectrum (expected to include 3600-3800 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 64-71 GHz, 71-76 GHz, 81-86 GHz and 92-94 GHz, etc.), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), the 70.2 GHz-71 GHz band, any band between 65.88 GHz and 71 GHz, bands currently allocated to automotive radar applications such as 76-81 GHz, and future bands including 94-300 GHz and above.

For purposes of this disclosure, radio communication technologies may be classified as one of a Short-Range radio communication technology or Cellular Wide Area radio communication technology. Short Range radio communication technologies may include Bluetooth, WLAN (e.g., according to any IEEE 802.11 standard), and other similar radio communication technologies. Cellular Wide Area radio communication technologies may include Global System for Mobile Communications (GSM), Code Division Multiple Access 2000 (CDMA2000), Universal Mobile Telecommunications System (UMTS), Long Term Evolution (LTE), General Packet Radio Service (GPRS), Evolution-Data Optimized (EV-DO), Enhanced Data Rates for GSM Evolution (EDGE), High Speed Packet Access (HSPA; including High Speed Downlink Packet Access (HSDPA), High Speed Uplink Packet Access (HSUPA), HSDPA Plus (HSDPA+), and HSUPA Plus (HSUPA+)), Worldwide Interoperability for Microwave Access (WiMax) (e.g., according to an IEEE 802.16 radio communication standard, e.g., WiMax fixed or WiMax mobile), etc., and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies.

The terms "radio communication network," "wireless network", "communication network," or the like, as utilized herein encompasses both an access section of a network (e.g., a radio access network (RAN) section) and a core section of a network (e.g., a core network section). The term "radio idle mode" or "radio idle state" used herein in reference to a terminal device refers to a radio control state in which the terminal device is not allocated at least one dedicated communication channel of a mobile communication network. The term "radio connected mode" or "radio connected state" used in reference to a terminal device refers to a radio control state in which the terminal device is allocated at least one dedicated uplink communication channel of a radio communication network.

Unless explicitly specified, the term "transmit" encompasses both direct (point-to-point) and indirect transmission (via one or more intermediary points). Similarly, the term "receive" encompasses both direct and indirect reception. Furthermore, the terms "transmit", "receive", "communicate", and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" may encompass one or both of transmitting and receiving, i.e., unidirectional or bidirectional communication in one or both of the incoming and outgoing directions. The term "calculate" may encompass both 'direct' calculations via a mathematical expression/ formula/relationship and 'indirect' calculations via lookup or hash tables and other array indexing or searching operations.

Figure 2:
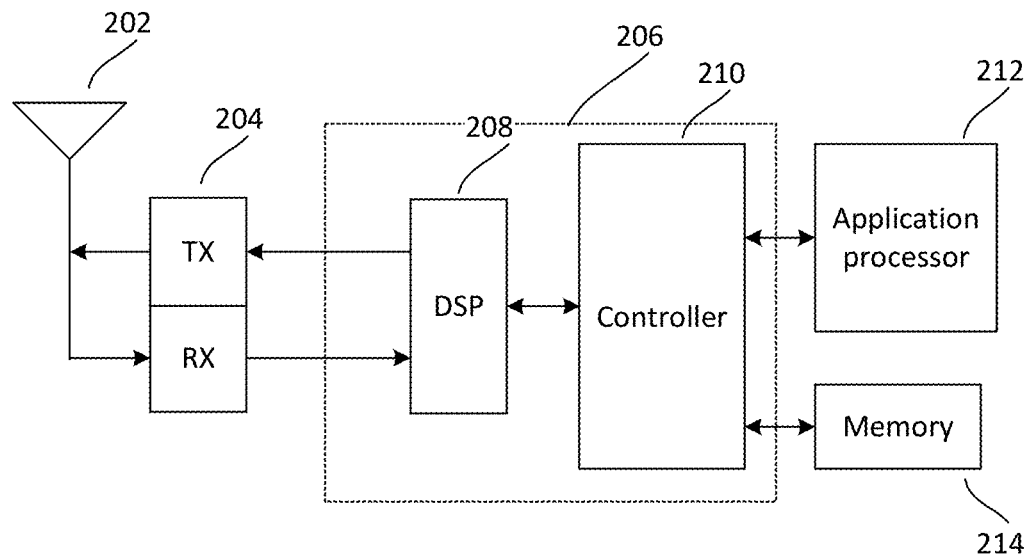
FIG. 2 exemplarily shows an internal configuration of terminal device according to some aspects.

FIGS. 1 and 2 depict an exemplary network and device architecture for wireless communications. In particular, FIG. 1 shows exemplary radio communication network 100 according to some aspects, which may include terminal devices 102 and 104 and network access nodes 110 and 120. Radio communication network 100 may communicate with terminal devices 102 and 104 via network access nodes 110 and 120 over a radio access network. Although certain examples described herein may refer to a particular radio access network context (e.g., 5G, NR, LTE, or other 3rd Generation Partnership Project (3GPP) networks, WLAN/Wi-Fi, Bluetooth, mmWave, etc.), these examples are demonstrative and may therefore be readily applied to any other type or configuration of radio access network. The number of network access nodes and terminal devices in radio communication network 100 is exemplary and is scalable to any amount.

In an exemplary cellular context, network access nodes 110 and 120 may be base stations (e.g., eNodeBs, NodeBs, Base Transceiver Stations (BTSs), or any other type of base station), while terminal devices 102 and 104 may be cellular terminal devices (e.g., Mobile Stations (MSs), User Equipment (UEs), or any type of cellular terminal device). Network access nodes 110 and 120 may therefore interface (e.g., via backhaul interfaces) with a cellular core network such as an Evolved Packet Core (EPC, for LTE), Core Network (CN, for UMTS), or other cellular core networks, which may also be considered part of radio communication network 100. The cellular core network may interface with one or more external data networks. In an exemplary short-range context, network access node 110 and 120 may be access points (APs, e.g., WLAN or WLAN APs), while terminal device 102 and 104 may be short range terminal devices (e.g., stations (STAs)). Network access nodes 110 and 120 may interface (e.g., via an internal or external router) with one or more external data networks.

Network access nodes 110 and 120 (and, optionally, other network access nodes of radio communication network 100 not explicitly shown in FIG. 1) may accordingly provide a radio access network to terminal devices 102 and 104 (and, optionally, other terminal devices of radio communication network 100 not explicitly shown in FIG. 1). In an exemplary cellular context, the radio access network provided by network access nodes 110 and 120 may enable terminal devices 102 and 104 to wirelessly access the core network via radio communications. The core network may provide switching, routing, and transmission, for traffic data related to terminal devices 102 and 104, and may further provide access to various internal data networks (e.g., control nodes, routing nodes that transfer information between other terminal devices on radio communication network 100, etc.) and external data networks (e.g., data networks providing voice, text, multimedia (audio, video, image), and other Internet and application data). In an exemplary short-range context, the radio access network provided by network access nodes 110 and 120 may provide access to internal data networks (e.g., for transferring data between terminal devices connected to radio communication network 100) and external data networks (e.g., data networks providing voice, text, multimedia (audio, video, image), and other Internet and application data).

The radio access network and core network (if applicable, such as for a cellular context) of radio communication network 100 may be governed by communication protocols that can vary depending on the specifics of radio communication network 100. Such communication protocols may define the scheduling, formatting, and routing of both user and control data traffic through radio communication network 100, which includes the transmission and reception of such data through both the radio access and core network domains of radio communication network 100. Accordingly, terminal devices 102 and 104 and network access nodes 110 and 120 may follow the defined communication protocols to transmit and receive data over the radio access network domain of radio communication network 100, while the core network may follow the defined communication protocols to route data within and outside of the core network. Exemplary communication protocols include LTE, UMTS, GSM, WiMAX, Bluetooth, WLAN, mmWave, etc., any of which may be applicable to radio communication network 100.

As shown in radio communication network 100, terminal device 102 and network access node 110 may each use beamforming techniques 102b and 110b, respectively, for communicating with one another. Each may both have at least one RF chain and multi-antenna arrays. Accordingly, the devices shown in network 100 may be capable of bi-directional beamforming. If a user is in the direction of the beam 102b, for example, the user may be subject to increased SAR levels. In order to comply with regulatory measures, terminal device 102 may need to implement TAS mechanisms so that the amount of energy transmitted in the direction of the user does not violate (i.e., go over) a TAS energy budget for a given period of time. However, in addition to complying with these regulatory measures, terminal device 102 must also attempt to maintain a robust wireless link with network access node 110 to ensure communication quality is not degraded.

FIG. 2 shows an internal configuration of terminal device 102 according to some aspects, which may include antenna system 202, radio frequency (RF) transceiver 204, baseband modem 206 (including digital signal processor 208 and protocol controller 210), application processor 212, and memory 214. Although not explicitly shown in FIG. 2, in some aspects terminal device 102 may include one or more additional hardware and/or software components, such as processors/microprocessors, controllers/microcontrollers, other specialty or generic hardware/processors/circuits, peripheral device(s), memory, power supply, external device interface(s), subscriber identity module(s) (SIMs), user input/output devices (display(s), keypad(s), touchscreen(s), speaker(s), external button(s), camera(s), microphone(s), etc.), or other related components.

Terminal device 102 may transmit and receive radio signals on one or more radio access networks. Baseband modem 206 may direct such communication functionality of terminal device 102 according to the communication protocols associated with each radio access network, and may execute control over antenna system 202 and RF transceiver 204 to transmit and receive radio signals according to the formatting and scheduling parameters defined by each communication protocol. Although various practical designs may include separate communication components for each supported radio communication technology (e.g., a separate antenna, RF transceiver, digital signal processor, and controller), for purposes of conciseness the configuration of terminal device 102 shown in FIG. 2 depicts only a single instance of such components.

Terminal device 102 may transmit and receive wireless signals with antenna system 202, which may be a single antenna or an antenna array that includes multiple antennas. In some aspects, antenna system 202 may additionally include analog antenna combination and/or beamforming circuitry. In the receive (RX) path, RF transceiver 204 may receive analog radio frequency signals from antenna system 202 and perform analog and digital RF front-end processing on the analog radio frequency signals to produce digital baseband samples (e.g., In-Phase/Quadrature (IQ) samples) to provide to baseband modem 206. RF transceiver 204 may include analog and digital reception components including amplifiers (e.g., Low Noise Amplifiers (LNAs)), filters, RF demodulators (e.g., RF IQ demodulators)), and analog-to-digital converters (ADCs), which RF transceiver 204 may utilize to convert the received radio frequency signals to digital baseband samples. In the transmit (TX) path, RF transceiver 204 may receive digital baseband samples from baseband modem 206 and perform analog and digital RF front-end processing on the digital baseband samples to produce analog radio frequency signals to provide to antenna system 202 for wireless transmission. RF transceiver 204 may thus include analog and digital transmission components including amplifiers (e.g., Power Amplifiers (PAs), filters, RF modulators (e.g., RF IQ modulators), and digital-to-analog converters (DACs), which RF transceiver 204 may utilize to mix the digital baseband samples received from baseband modem 206 and produce the analog radio frequency signals for wireless transmission by antenna system 202. In some aspects baseband modem 206 may control the radio transmission and reception of RF transceiver 204, including specifying the transmit and receive radio frequencies for operation of RF transceiver 204.

As shown in FIG. 2, baseband modem 206 may include digital signal processor 208, which may perform physical layer (PHY, Layer 1) transmission and reception processing to, in the transmit path, prepare outgoing transmit data provided by protocol controller 210 for transmission via RF transceiver 204, and, in the receive path, prepare incoming received data provided by RF transceiver 204 for processing by protocol controller 210. Digital signal processor 208 may be configured to perform one or more of error detection, forward error correction encoding/decoding, channel coding and interleaving, channel modulation/demodulation, physical channel mapping, radio measurement and search, frequency and time synchronization, antenna diversity processing, power control and weighting, rate matching/dematching, retransmission processing, interference cancelation, and any other physical layer processing functions. Digital signal processor 208 may be structurally realized as hardware components (e.g., as one or more digitally-configured hardware circuits or FPGAs), software-defined components (e.g., one or more processors configured to execute program code defining arithmetic, control, and I/O instructions (e.g., software and/or firmware) stored in a non-transitory computer-readable storage medium), or as a combination of hardware and software components. In some aspects, digital signal processor 208 may include one or more processors configured to retrieve and execute program code that defines control and processing logic for physical layer processing operations. In some aspects, digital signal processor 208 may execute processing functions with software via the execution of executable instructions. In some aspects, digital signal processor 208 may include one or more dedicated hardware circuits (e.g., ASICs, FPGAs, and other hardware) that are digitally configured to specific execute processing functions, where the one or more processors of digital signal processor 208 may offload certain processing tasks to these dedicated hardware circuits, which are known as hardware accelerators. Exemplary hardware accelerators can include Fast Fourier Transform (FFT) circuits and encoder/decoder circuits. In some aspects, the processor and hardware accelerator components of digital signal processor 208 may be realized as a coupled integrated circuit.

Terminal device 102 may be configured to operate according to one or more radio communication technologies. Digital signal processor 208 may be responsible for lower-layer processing functions (e.g., Layer 1/PHY) of the radio communication technologies, while protocol controller 210 may be responsible for upper-layer protocol stack functions (e.g., Data Link Layer/Layer 2 and/or Network Layer/Layer 3). Protocol controller 210 may thus be responsible for controlling the radio communication components of terminal device 102 (antenna system 202, RF transceiver 204, and digital signal processor 208) in accordance with the communication protocols of each supported radio communication technology, and accordingly may represent the Access Stratum and Non-Access Stratum (NAS) (also encompassing Layer 2 and Layer 3) of each supported radio communication technology. Protocol controller 210 may be structurally embodied as a processor configured to execute protocol stack software (retrieved from a controller memory) and subsequently control the radio communication components of terminal device 102 to transmit and receive communication signals in accordance with the corresponding protocol stack control logic defined in the protocol stack software. Protocol controller 210 may include one or more processors configured to retrieve and execute program code that defines the upper-layer protocol stack logic for one or more radio communication technologies, which can include Data Link Layer/Layer 2 and Network Layer/Layer 3 functions. Protocol controller 210 may be configured to perform both user-plane and control-plane functions to facilitate the transfer of application layer data to and from radio terminal device 102 according to the specific protocols of the supported radio communication technology. User-plane functions can include header compression and encapsulation, security, error checking and correction, channel multiplexing, scheduling and priority, while control-plane functions may include setup and maintenance of radio bearers. The program code retrieved and executed by protocol controller 210 may include executable instructions that define the logic of such functions.

In some aspects, terminal device 102 may be configured to transmit and receive data according to multiple radio communication technologies. Accordingly, in some aspects one or more of antenna system 202, RF transceiver 204, digital signal processor 208, and protocol controller 210 may include separate components or instances dedicated to different radio communication technologies and/or unified components that are shared between different radio communication technologies. For example, in some aspects protocol controller 210 may be configured to execute multiple protocol stacks, each dedicated to a different radio communication technology and either at the same processor or different processors. In some aspects, digital signal processor 208 may include separate processors and/or hardware accelerators that are dedicated to different respective radio communication technologies, and/or one or more processors and/or hardware accelerators that are shared between multiple radio communication technologies. In some aspects, RF transceiver 204 may include separate RF circuitry sections dedicated to different respective radio communication technologies, and/or RF circuitry sections shared between multiple radio communication technologies. In some aspects, antenna system 202 may include separate antennas dedicated to different respective radio communication technologies, and/or antennas shared between multiple radio communication technologies. Accordingly, while antenna system 202, RF transceiver 204, digital signal processor 208, and protocol controller 210 are shown as individual components in FIG. 2, in some aspects antenna system 202, RF transceiver 204, digital signal processor 208, and/or protocol controller 210 may encompass separate components dedicated to different radio communication technologies.

The terminal device 102 may also include application processor 212 and memory 214. Application processor 212 may be a CPU, and may be configured to handle the layers above the protocol stack, including the transport and application layers. Application processor 212 may be configured to execute various applications and/or programs of terminal device 102 at an application layer of terminal device 102, such as an operating system (OS), a user interface (UI) for supporting user interaction with terminal device 102, and/or various user applications. The application processor may interface with baseband modem 206 and act as a source (in the transmit path) and a sink (in the receive path) for user data, such as voice data, audio/video/image data, messaging data, application data, basic Internet/web access data, etc. In the transmit path, protocol controller 210 may therefore receive and process outgoing data provided by application processor 212 according to the layer-specific functions of the protocol stack, and provide the resulting data to digital signal processor 208. Digital signal processor 208 may then perform physical layer processing on the received data to produce digital baseband samples, which digital signal processor may provide to RF transceiver 204. RF transceiver 204 may then process the digital baseband samples to convert the digital baseband samples to analog RF signals, which RF transceiver 204 may wirelessly transmit via antenna system 202. In the receive path, RF transceiver 204 may receive analog RF signals from antenna system 202 and process the analog RF signals to obtain digital baseband samples. RF transceiver 204 may provide the digital baseband samples to digital signal processor 208, which may perform physical layer processing on the digital baseband samples. Digital signal processor 208 may then provide the resulting data to protocol controller 210, which may process the resulting data according to the layer-specific functions of the protocol stack and provide the resulting incoming data to application processor 212. Application processor 212 may then handle the incoming data at the application layer, which can include execution of one or more application programs with the data and/or presentation of the data to a user via a user interface.

Memory 214 may embody a memory component of terminal device 102, such as a hard drive or another such permanent memory device. Although not explicitly depicted in FIG. 2, the various other components of terminal device 102 shown in FIG. 2 may additionally each include integrated permanent and non-permanent memory components, such as for storing software program code, buffering data, etc.

In accordance with some radio communication networks, terminal devices 102 and 104 may execute mobility procedures to connect to, disconnect from, and switch between available network access nodes of the radio access network of radio communication network 100. As each network access node of radio communication network 100 may have a specific coverage area, terminal devices 102 and 104 may be configured to select and re-select between the available network access nodes in order to maintain a strong radio access connection with the radio access network of radio communication network 100. For example, terminal device 102 may establish a radio access connection with network access node 110 while terminal device 104 may establish a radio access connection with network access node 120. In the event that the current radio access connection degrades, terminal devices 102 or 104 may seek a new radio access connection with another network access node of radio communication network 100; for example, terminal device 104 may move from the coverage area of network access node 120 into the coverage area of network access node 110. As a result, the radio access connection with network access node 120 may degrade, which terminal device 104 may detect via radio measurements such as signal strength or signal quality measurements of network access node 120.

Figure 3:
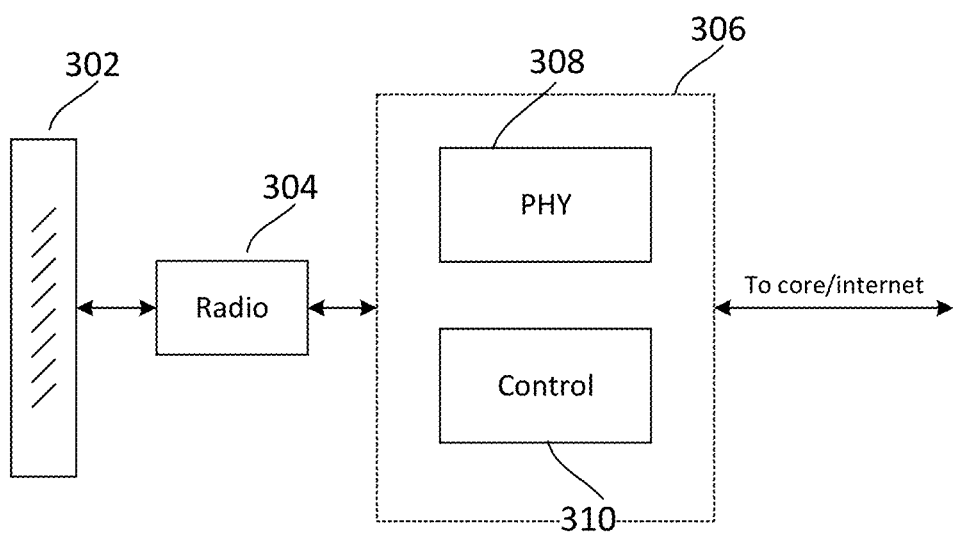
FIG. 3 exemplarily shows an internal configuration of a network access node in some aspects.

FIG. 3 shows an exemplary internal configuration of a network access node, such as network access node 110, according to some aspects. As shown in FIG. 3, network access node 110 may include antenna system 302, radio transceiver 304, and baseband subsystem 306 (including physical layer processor 308 and protocol controller 310). In an abridged overview of the operation of network access node 110, network access node 110 may transmit and receive wireless signals via antenna system 302, which may be an antenna array including multiple antennas. Radio transceiver 304 may perform transmit and receive RF processing to convert outgoing baseband samples from baseband subsystem 306 into analog radio signals to provide to antenna system 302 for radio transmission and to convert incoming analog radio signals received from antenna system 302 into baseband samples to provide to baseband subsystem 306. Physical layer processor 308 may be configured to perform transmit and receive PHY processing on baseband samples received from radio transceiver 304 to provide to controller 310 and on baseband samples received from controller 310 to provide to radio transceiver 304. Controller 310 may control the communication functionality of network access node 110 according to the corresponding radio communication technology protocols, which may include exercising control over antenna system 302, radio transceiver 304, and physical layer processor 308. Each of radio transceiver 304, physical layer processor 308, and controller 310 may be structurally realized with hardware (e.g., with one or more digitally-configured hardware circuits or FPGAs), as software (e.g., as one or more processors executing program code defining arithmetic, control, and I/O instructions stored in a non-transitory computer-readable storage medium), or as a mixed combination of hardware and software. In some aspects, radio transceiver 304 may be a radio transceiver including digital and analog radio frequency processing and amplification circuitry. In some aspects, radio transceiver 304 may be a software-defined radio (SDR) component implemented as a processor configured to execute software-defined instructions that specify radio frequency processing routines. In some aspects, physical layer processor 308 may include a processor and one or more hardware accelerators, where the processor is configured to control physical layer processing and offload certain processing tasks to the one or more hardware accelerators. In some aspects, controller 310 may be a controller configured to execute software-defined instructions that specify upper-layer control functions. In some aspects, controller 310 may be limited to radio communication protocol stack layer functions, while in other aspects controller 310 may also be configured for transport, internet, and application layer functions.

Network access node 110 may thus provide the functionality of network access nodes in radio communication networks by providing a radio access network to enable served terminal devices to access communication data. For example, network access node 110 may also interface with a core network, one or more other network access nodes, or various other data networks and servers via a wired or wireless backhaul interface.

The devices and methods presented herein provide supplements to the TAS mechanism that may be implemented in the Medium Access Control (MAC) and/or PHY layers in order to average SAR over time, where the base TAS mechanism may be configured to maximize Tx power based on a history of the Tx duty cycle (DC) where lower Tx DCs allow more packets to have a higher Tx power. This disclosure provides TAS computation methods to be implemented along with the base TAS mechanism to achieve better optimization of the TAS transmission energy budget by predicting the energy needed to transmit a packet based on a requested PBO (rPBO), and methods to determine whether a second PBO (sPBO) should be applied instead of the rPBO if the sPBO will result in a lower overall transmission energy spent per transmission of the packet. The sPBO may result in a lower overall transmission energy spent per transmission of the packet based on the OTA time being lower and the corresponding operational rate (e.g., PHY rate) being greater than that had the requested PBO been applied. In other words, based on the calculations of the packet energy OTA, instead of simply calculating the PBO based on DC history using a moving power-average integral, the TAS mechanisms disclosed herein are able to predict the PHY rate based on the rPBO and determine whether a better, more efficient transmission rate may be implemented via a sPBO that will, while transmitting at a higher TX power, actually result in a lower total packet energy OTA.

The energy saved by the sPBO may be added as energy to the TAS transmission energy power budget.

In some aspects, the methods and devices disclosure herein implement a stored database, referred to as a fixed rate knee point database (FRKD), and a margin table referred to as a rate-to-rate knee margin table (R2RKMT).

The FRKD may be based on calculations and/or measurements from any one or more of the following: real-life system measurements in differing levels of noise and/or simulation results from channel emulations of different types including Additive white Gaussian Noise (AWGN) parameters or D-channel parameters. For each operational rate (e.g., PHY rate), the FRKD may provide a signal quality strength indication at which the PHY rate will not be able to maintain a certain throughput (a "goodput" above a predefined threshold) or have a signal quality strength indicator value above a certain threshold. The signal quality strength indicators/indications may be based on signal quality strength indicator (SQSI), e.g. a received signal strength indicator (RSSI), a signal to noise interference ratio, packet error rate (PER), error vector magnitude (EVM) value, or the like. Although the description herein may rely on the RSSI example for purposes of explanation, it is appreciated that other signal quality strength indicators (SQSIs) like those listed may be similarly utilized. The FRKD may include values to account for any rate, power restriction applied by location, channels, bandwidth, modulations, antenna diversity type, and/or channel state condition. In sum, the FRKD includes information correlating the throughput to the attenuation for each of a plurality of PHY rates. The FRKD is explained in greater detail in the description related to FIGS. 10-11.

The R2RKMT may be based on the FRKD and be table including values of the difference between each of the PHY rate's knee-points to neighboring PHY rate's knee-points. In some aspects, this optional margin table may be included to save real-time processing over using just the FRKD described herein. The R2RKMT is also discussed in greater detail in the description related to FIGS. 10-11.

In some aspects, methods and devices are configured to receive an instruction to apply a requested PBO (rPBO) for transmitting one or more data packets at an adjusted transmission power (rPBO_TxPwr) adapted from a current transmission power; estimate a first energy quantity (rPBOpacketEnergy) for transmitting the one or more data packets based on the adjusted transmission power and a first estimated length of time (TxOP_limit) for transmitting the one or more data packets at the adjusted transmission power; search for a second transmission power (sPBO_TxPwr, corresponding to the LoopPBO_TXPwer for the respective iteration later described) that is greater than the adjusted transmission power and estimate a second energy quantity (sPBOpacketEnergy) based on the second transmission power and a second estimated length of time (PacketTimeOTA) for transmitting the one or more data packets at the second transmission power rate, where the second energy quantity is less than the first energy quantity; and apply a second PBO based on the second transmission power for transmitting the one or more data packets instead of applying the requested PBO. The adjusted transmission power may correspond to the power requested by a TAS mechanism, which may initiate the methods described herein.

Figure 4:
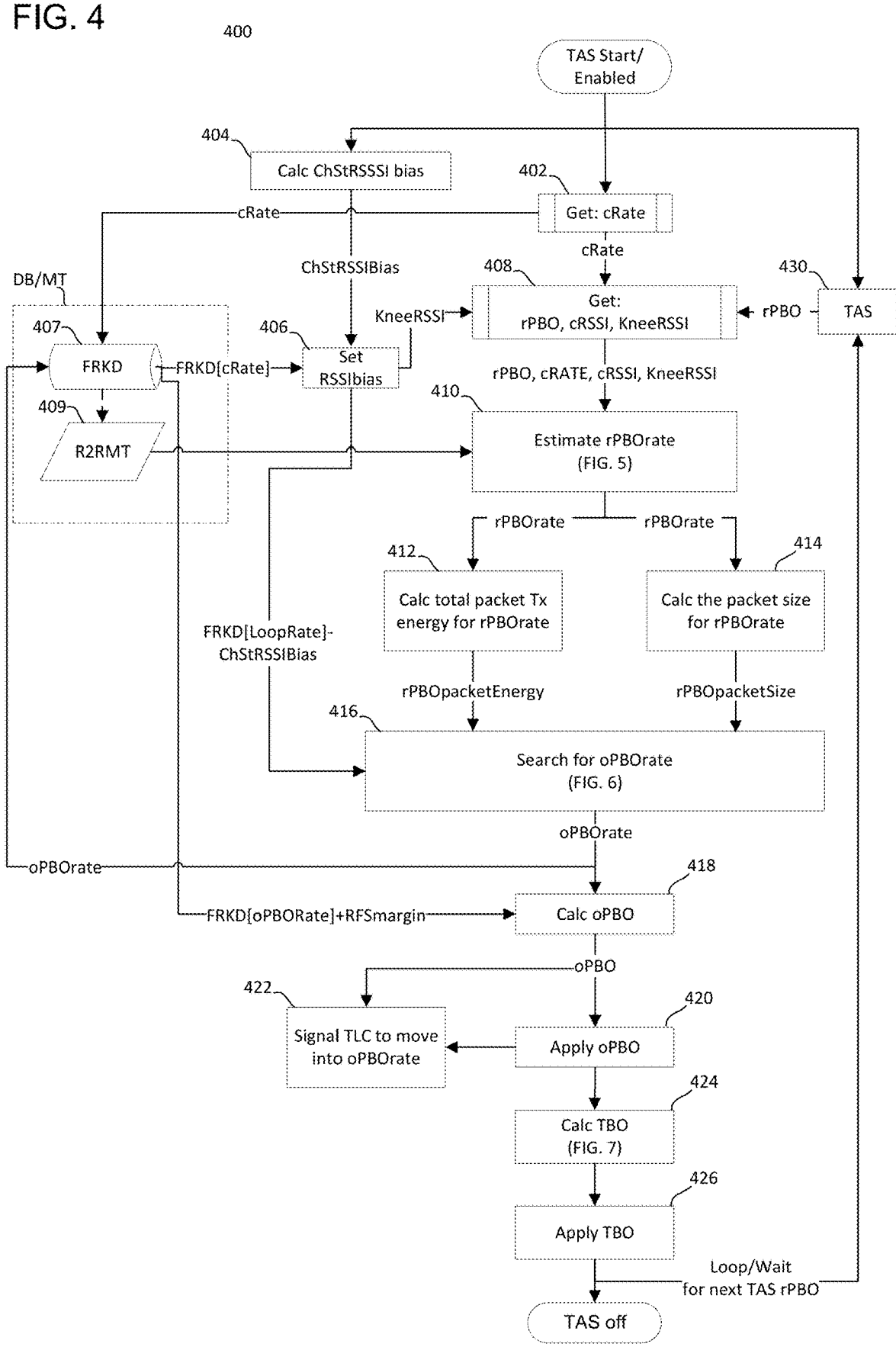
FIG. 4 exemplarily shows a flowchart according to some aspects.

FIG. 4 shows a method flowchart 400 according to some aspects. It is appreciated that method flowchart 400 is exemplary in nature and may thus be simplified for purposes of this explanation.

In 402, the current operational rate (cRate) is determined. This rate may be the current PHY rate corresponding to the current Tx power being used.

In 404, a metric to measure the channel state signal quality strength indicator (SQSI) bias is determined, e.g., a Channel State RSSI bias (ChStRSSI bias). The ensuing description may describe this as being a received signal strength indication (RSSI), but it is appreciated that other signal quality strength indicators (SQSIs) such as signal-to-noise ratios (SNRs) or the like may be used.

Figure 10:
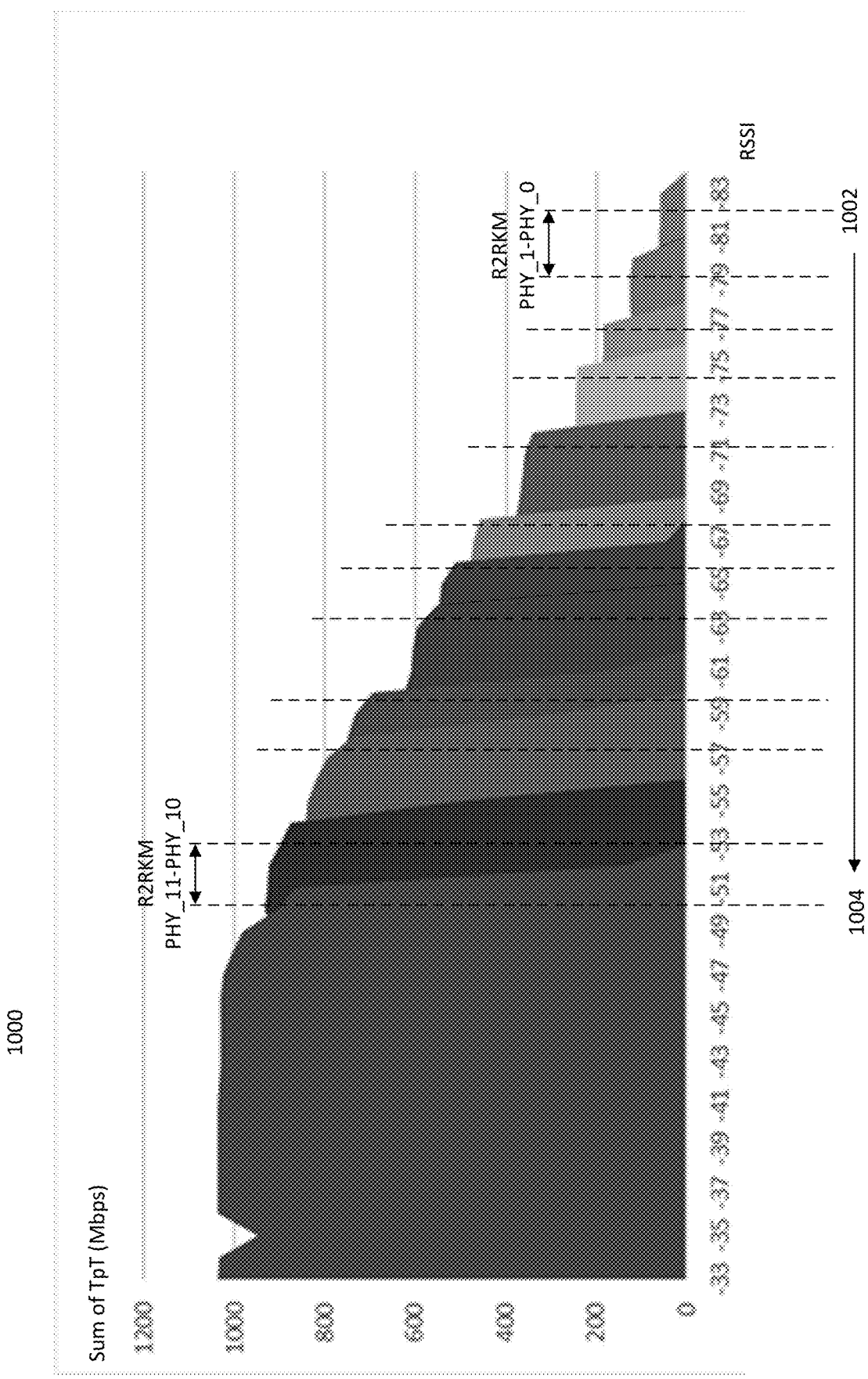
FIG. 10 exemplarily shows a graph illustrating an explanation of a Fixed Rate Knee Point Database (FRKD) according to some aspects.
Figure 11:
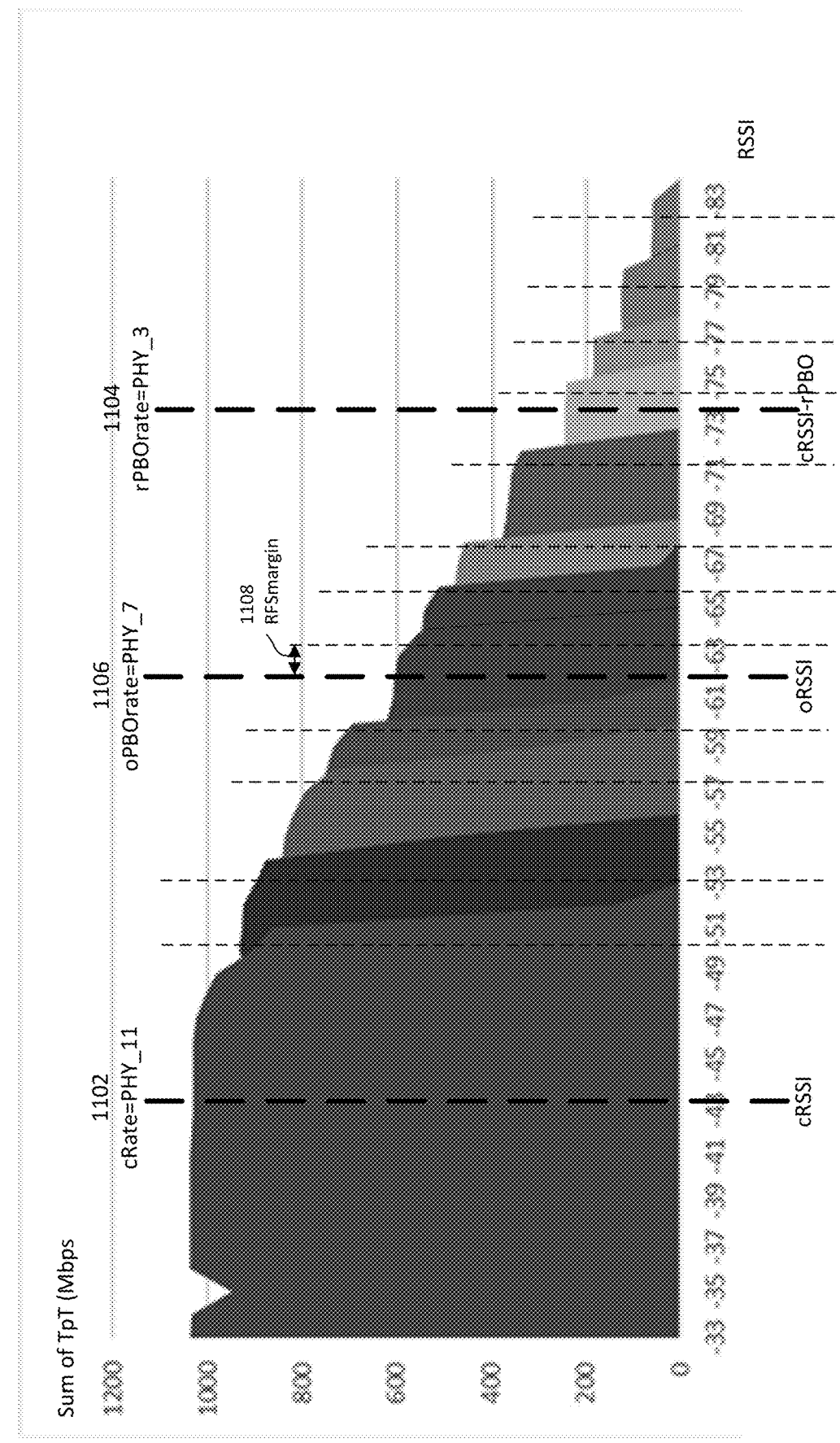
FIG. 11 exemplarily shows a graph illustrating an explanation with corresponding annotations of features of the methods along with a FRKD according to some aspects.

As previously touched on and explained in greater detail in FIGS. 10-11, the FRKD may include values based on measurements from test setups, field measurements, or channel simulations, but it may not include information that represents the exact current state of the communication channel. Also, while the throughput versus attenuation (TvA) determinations may be based on acknowledgements (ACKs) from the receiver side, the ACKs may be impacted by unknowns such as noise, gain, shadowing, multipath, receiver-diversity-codes, which may shift the knee point of different PHY rates together by relatively the same amount. Accordingly, after turning the TAS is initiated (e.g., which may be triggered at terminal device power on and connection to a radio communication network), the method may include determining a channel state RSSI bias (ChStRSSI bias). This may include finding one knee point a current operational rate and aligning it with a real-beacon RSSI. In some aspects, this may be triggered when the transmission link control (TLC) changes the PHY rate since that means the channel state has changed. This may be provided from the TLC at no cost nor delays since whenever the TLC searches for a new rate, it performs the measurements needed to determine a certain knee point and can store the its corresponding signal quality strength indicator value (e.g., RSSI value).

The calculation of the ChStRSSI bias 402 may include an iterative search flow. This bias search flow is to set incrementally increasing PBOs until the TLC stabilizes and changes the PHY rate down. This point represents the knee point of the current operational rate, and its associated RSSI (or other signal quality strength indicator) is the current PHY rate minus the accumulative PBO. Using this information, the bias to the FRKD signal quality strength indicator (e.g., RSSI) value may be determined. This may include saving the current operational PHY rate of the transmission settings and its associated beacon—RSSI (cRSSI).

In some aspects, the iterative bias search flow to calculate the ChStRSSI bias is as follows. First, the current operational rate (i.e., current rate, cRate) corresponding to the current transmission power (before a BO is applied) is saved along with its corresponding beacon-RSSI (cRSSI). The cRate may correspond to the current PHY rate. Next, a PBO with a first PBO value (BiasSearchPBO) is incrementally applied in one or more iterations to obtain a modified power rates for each iteration. The BiasSearchPBO may be selected to be a positive value, resulting in a larger PBO in each increment (i.e., lower Tx power). Once the modified transmission power rate is stabilized in response to the PBO, the bias search flow includes determining whether the modified transmission power rate is lower than the current transmission rate for the respective iteration. If the modified transmission power rate is lower than the current transmission power rate, the method may include concluding the iterative search and computing a current transmission power rate knee point (cRateKnee) by calculating a difference of the first PBO value (BiasSearchPBO value) of the respective iteration from the current RSSI. The cRateKnee may therefore be computed based on the equation cRateKnee=cRSSI-BiasSearchPBO. The ChStRSSI bias may be computed based on the equation ChStRSSI=cRateKnee-FRKD[cRate], where FRKD[cRate] is obtained based on the cRate and the FRKD 407.

In some aspects, other signal quality indicator values other than the RSSI may be used. For example, the other signal quality indicator values may include signal to noise ratios or the like.

In 406, the RSSI knee point (KneeRSSI) of the current operational rate (cRate) is extracted by searching the RSSI from the FRKD database corresponding to the cRate and adjusting it with the ChStRSSI bias calculated in 404. The KneeRSSI may be computed based on the equation KneeRSSI=FRKD [cRate]-ChStRSSI bias.

In 408, the requested PBO (rPBO) is received from the TAS mechanism 430. In some aspects, the rPBO may be based on a Tx DC and/or a power moving average integral to comply with SAR regulators and/or standardization limits. Other rPBO may be issued as well, including those based on congestion levels and/or device temperature considerations. In addition to receiving the rPBO, the aforementioned current operational rate (cRate) along with its corresponding signal quality value indicator (e.g., cRSSI) and the KneeRSSI are forwarded on for estimating the operational rate that the rPBO would cause TLC to fall into (i.e., rPBOrate) 410 if the rPBO were applied. The estimation of the rPBOrate (i.e., the adjusted operational rate) 410 is described in greater detail in FIG. 5.

Figure 5:
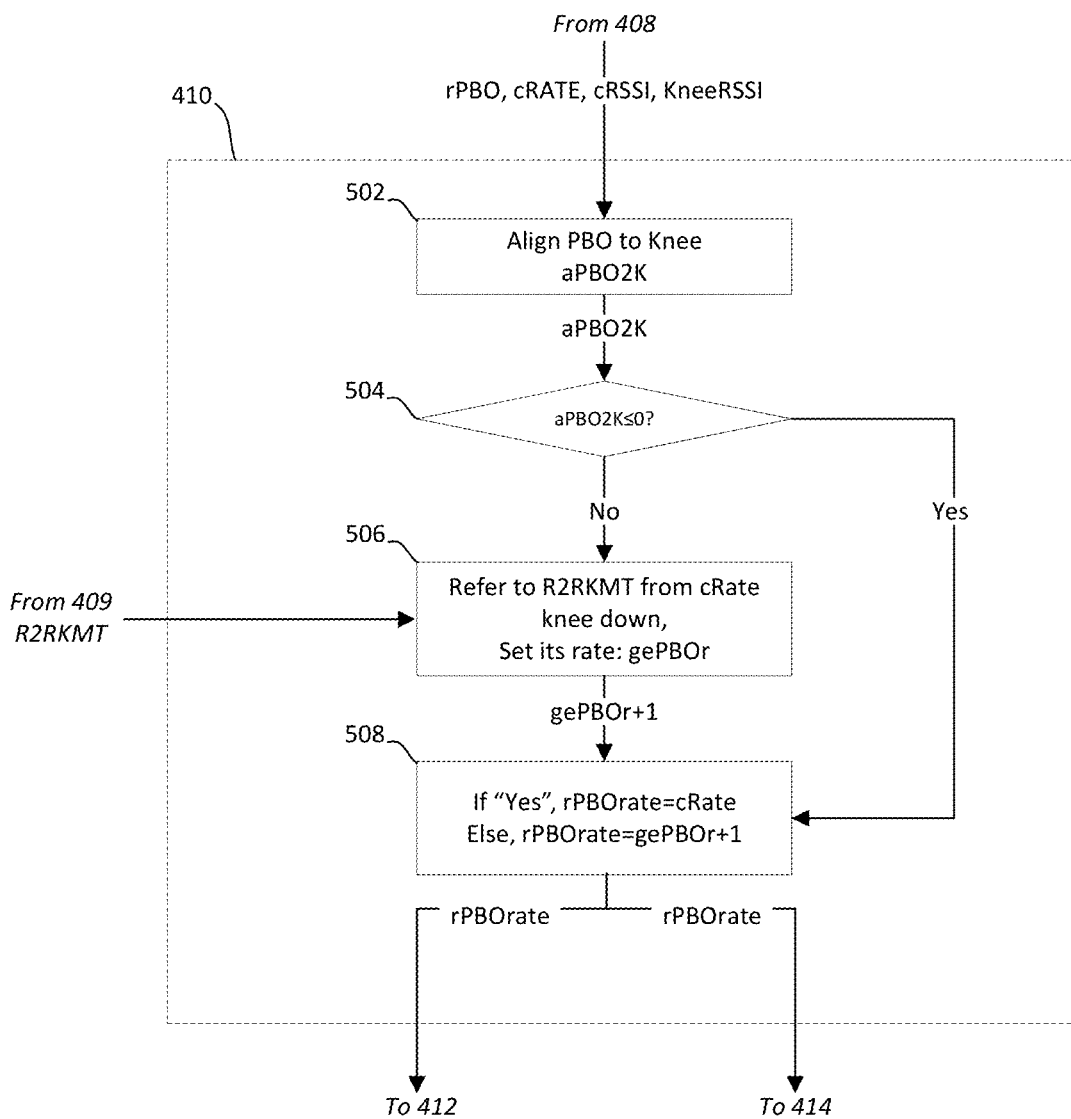
FIG. 5-7 exemplarily show sub-method flowcharts corresponding to FIG. 4 according to some aspects.

Referring to FIG. 5, the process to estimate the adjusted operational rate (rPBOrate) corresponding to the rate that the rPBO would cause the TLC PHY to fall into is computed by utilizing a PBO Rate Estimator function (PBOrE), i.e., rPBOrate=PBOrE (rPBO, cRate, cRSSI, KneeRSSI). The function is illustratively described in 502-508.

In 502, the align the PBO to a Knee (aPBO2K) feature includes reducing from the rPBO the margin from the cRSSI to the knee point of the current operational rate (i.e., cRate). The function may be described as aPBO2K=rPBO-(cRSSI-KneeRSSI).

In 504, it is determined whether the aPBO2K value is negative or equal to zero. If the aPBO2K value is less than or equal to zero, the adjusted operational rate estimation process may conclude and the adjusted operational rate (rPBOrate) may be set to be equal to the current operational rate (cRate) since it means that the rPBO would not take the attenuation point over the knee point of the same operational rate (discussed in more detail in FIGS. 10-11).

If the aPBO2K value is positive, then the process may include referencing the R2RKMT (shown in 409 and explained in greater detail in FIGS. 10-11) using the current operational rate (cRate) in 506. The R2RKMT is searched from the cRate knee point to find the first next margin that is greater than or equal to the aPBO2K, and the rate greater than this margin is set as gePBOr. Then, the operational rate one value higher than the gePBOr (gePBOr+1) is returned and set as the rOBOrate since this corresponds the gap that the rPBO would cause operational rate (e.g., PHY rate) to fall to.

Referring back to FIG. 4, once the adjusted operational rate (rPBOrate) that the rPBO would cause the operational rate to fall to is determined, two parameters may be calculated.

In 412, the total packet Tx energy for the adjusted operational rate (rPBOrate) is calculated. The total packet Tx energy for the rPBOrate may be the first energy quantity (rPBOpacketenergy) for transmitting the one or more data packets based on the adjusted transmission power and a first estimated length of time for transmitting the one or more data packets at the adjusted transmission power. This first energy quantity (rPBOpacketenergy) may be determined by multiplying the adjusted transmission power by the first estimated length of time, where the first estimated length of time an over the air time is determined based on a size of the one or more data packets divided by the adjusted operational rate. The adjusted transmission power may be determined based on the current transmission power and the power value in the rPBO. The rPBOpacketenergy may be defined as rPBOpacketenergy=rPBO_TxPwr*PacketTimeOTA, where the rPBO_TxPwr is the Tx target power if the rPBO is applied and PacketTimeOTA is the time OTA to transmit the packet. The PacketTimeOTA may further be defined as PacketTimeOTA=PacketSize/rPBOrate, so the equation for rPBOpacketenergy may be simplified to rPBOpacketenergy=rPBO_TxPwr*PacketSize/rPBOrate=rPBO_TxPwr*TxOP_limit, where TxOP_limit is the maximum packet time allowed by TAS. The calculation for the maximum packet time allowed by TAS (i.e., TxOP_limit) is generally performed in the other direction for TAS purposes since the system usually limits the maximum packet time (TxOP) based on the power integral aggregation limit, so for the rPBOrate, it can be used to calculate the packet size corresponding to that rate. In such cases, the PacketSize may later be calculated as PacketSize=TxOP limierPBOrate.

In 414, the packet size corresponding to the rPBOrate is calculated based on the formula rPBOpacketSize=TxOP_limit*rPBOrate.

Figure 6:
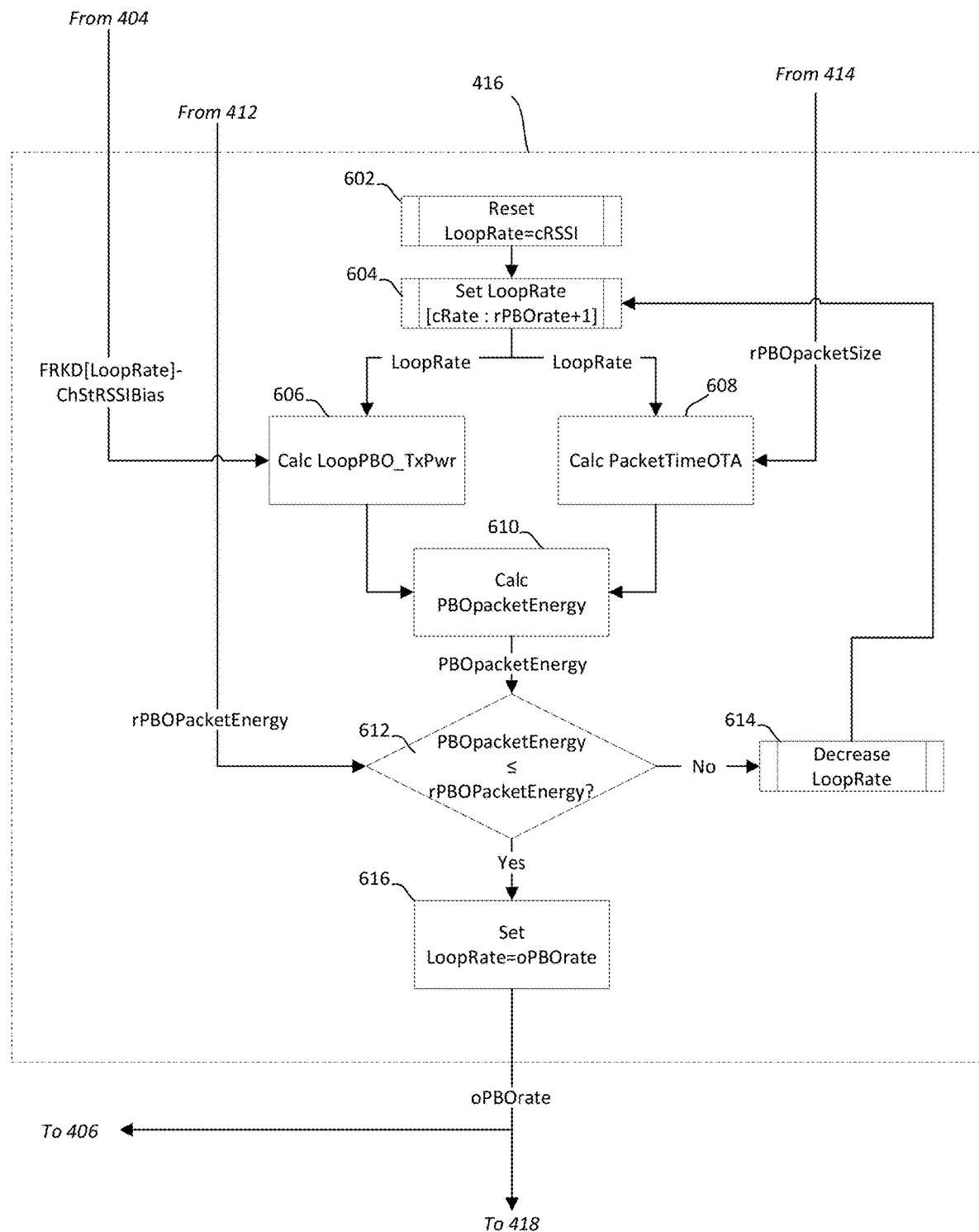

A search for the second PBO rate (sPBOrate) is performed in 416. FIG. 6 describes this method to determine the sBOrate, which includes calculating a second transmission power (LoopPBO_TxPwr for the last loop as will be described) and a second estimated length of time (PacketTimeOTA) for transmitting the data packets at the second transmission power, in greater detail. By calculating the second transmission power and the second length of time, the second energy quantity (PBOpacketenergy) may be determined.

Referring to FIG. 6, the search for the sPBOrate may include receiving the rPBOpacketEnergy calculated in 412, the rPBOpacketSize calculated in 414, and also a signal quality indicator value (e.g., RSSI) from the FRKD offset by the ChStRSSI bias from 404. FIG. 6 describes a process for searching, for the rPBOPacketSize calculated in 414, if there is a higher, second PHY rate (sPBOrate) induced by a smaller second PBO (i.e., with higher Tx power) that will spend less total energy (i.e., the spent total energy using the sPBO will be <rPBOpacketEnergy) for transmitting the same packet. In other words, FIG. 6 illustrates the determining of a second transmission power that is greater than the adjusted transmission power and the estimating of a second energy quantity based on the second transmission power and a second estimated length of time for transmitting the one or more data packets at the second transmission power, where the second energy quantity is less than the first energy quantity. The quantity may be related to the same packet size of the rPBO energy.

In 602, the selected operational rate (LoopRate) that the first iteration of the loop is set based on the current operational signal quality indicator, e.g., the cRSSI. For the first iteration of the loop, the LoopRate is then set as one rate higher than the rPBOrate in the direction of the cRate 604. In other words, the rPBOrate is the base line, the loop starts the search one rate above it.

In 606, based on the selected operation rate (LoopRate) for the respective iteration of the loop, the corresponding transmission power (LoopPBO_TxPwr) may be calculated. This includes using the selected operation rate to determine the corresponding SQSI value (e.g., RSSI value) from the FRKD, and this value is set as the knee point corresponding to the selected operational rate (LoopRate). The LoopPBO_TxPwr may then calculated according to the following equation: LoopPBO_TxPwr=FRKD[LoopRate]−ChStRSSI bias+RFSmargin, where RFSmargin is the rate-fall-safe-margin and is a predefined value to ensure that the knee point will not be crossed by deviation errors and cause a lower rate than expected.

In 608, based on the selected operation rate (LoopRate) for the respective iteration of the loop, the corresponding over the air (OTA) packet time (PacketTimeOTA) may be calculated according to the equation PacketTimeOTA=rPBOpacketSize/LoopRate, where the rPBOpacketSize is obtained from 414.

In 610, the corresponding packet energy for the respective iteration (PBOpacketEnergy) is determined based on multiplying the LoopPBO_TxPwr by the PacketTimeOTA.

In 612, the PBOpacketEnergy computed in 610 is compared to the rPBOPacketEnergy from 412. In other words, the corresponding packet energy of the respective iteration (PBOpacketEnergy) is compared to the first energy quantity (rPBOpacketEnergy). If the PBOpacketEnergy is less than or equal to the rPBOpacketEnergy, then the loop is stopped and the process proceeds to 616. In this case, the LoopPBO_TxPwr for the respective iteration may be the second transmission power (sPBO_TxPwr).

If the PBOpacketEnergy is not less than the rPBOpacketEnergy, then the process proceeds to a subsequent iteration of the loop, where the LoopRate for the subsequent iteration (i.e., the selected operational rate of the subsequent iteration) is one rate step lower than the one in the just performed iteration, i.e., the LoopRate is decreased in the direction of the cRate, 614. In this manner, the loop search continues to work in the direction that the rPBO would have induced. If the loop search fails to find a lower energy at the end of the loop, it will arrive at the same rate the rPBO would have induced and stop there.

Once an iteration of the loop that returns a PBOpacketEnergy less than the rPBOpacketEnergy, the selected operational rate (i.e., the LoopRate) for that iteration is set to the second operational rate (also referred to as the second PBO rate, sPBOrate) in 616. The second operational rate corresponds to the maximum second rate that is higher than or equal to the rPBOrate that will use less energy for the same PacketSize that the adjusted transmission power of the rPBO would have transferred.

Referring back to FIG. 4, the second operational rate (sPBOrate) is then used in 418 to calculate the second PBO (sPBO). In other words, the sPBO that should be applied to induce the sPBOrate is calculated. This may be performed by applying a reverse function of the PBO rate estimator (PBOrE) used in 410.

The sPBO may be calculated based on the current operational rate signal quality strength indicator (e.g., cRSSI), a FRKB value obtained using the sPBOrate as an input, and the RFS margin. In some aspects, where the cRSSI is exemplary used as the operational rate signal quality indicator, the equation for calculating the sPBO may be represented by: sPBO=cRSSI−(FRKD[sPBOrate]+RFSmargin). The process for determining this equation is as follows. First, the FRKD is searched for the corresponding signal quality indicator value (e.g., RSSI) of the knee point related to the sPBOrate. In some aspects, this RSSI value is termed the sRSSI, sRSSI=FRKD [sPBOrate]. Then, the sPBO is set at a distance of RFSmargin above this sRSSI value.

Once the sPBO is determined, it may be applied to the next packet to be transmitted 420.

In some aspects, for better optimization, the applied sPBO may bypass the TLC rate adaptation statistics gathering mechanism. For example, this may include forcing the TLC controller to command the PHY to operate in the sPBOrate or giving the TLC controller an input to start its search for a new PHY rate in the sPBOrate. The TLC controller may be the transmission power controller of one or more transmitters operably coupled to the processor(s) conducting the method shown in FIG. 4.

In some aspects, when the second PBO (sPBO) differs from the rPBO, i.e., a second energy quantity is computed that is less than the first energy quantity, then two additional optional actions may be implemented to calculate a TBO 424. A first option is that the packet size is kept the same as the one corresponding to the rPBOPacketEnergy, i.e., no further aggregation should be added and the TxOP is shortened. The shortened packet time OTA should therefore be followed by not transmission (i.e., a TBO) on the portion of time left compared to the packet time OTA that would have been used had the rPBO been applied. A second option is to shown in FIG. 7. This second option includes, after each instance in which an sPBO lower than the rPBO is applied, adding a TBO in the amount of the added energy of the additional packet size in the same TxOP in the sPBOrate that the sPBO is inducing. This flow may be described in 702-706.

Figure 7:
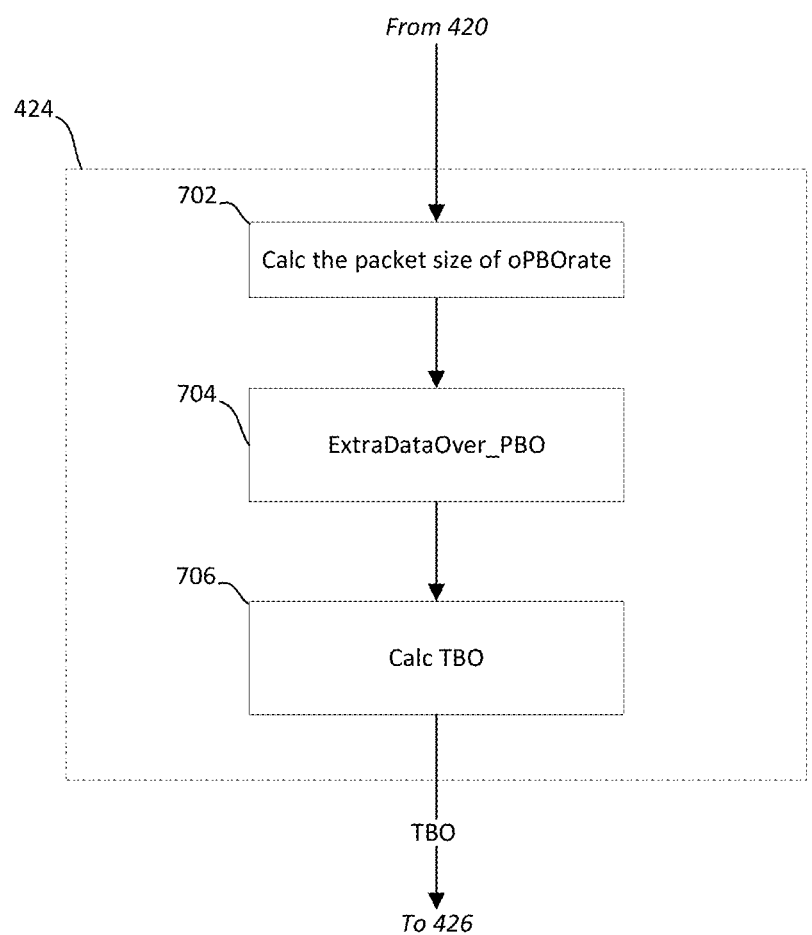

Referring to FIG. 7, the packet size (sPBOpacketSize) based on the sPBOrate of the sPBO is calculated 702, which may be computed according to the sPBOpacketSize=TxOP_limit*sPBOrate. In 704, the extra data packet size that the sPBOrate goes over the rPBO (ExtraDataOver_rPBO) is determined according to ExtraDataOver_rPBO=|sPBOpacketsize-rPBOpacketsize|. Then, in 706, the corresponding TBO is calculated, TBO=ExtraDataOver_rPBO/sPBOrate.

For either option TBO option in 424, the calculated TBO may be applied in 426. The TBO may be applied after the TxOP.

The process may then loop back and wait for the next TAS rPBO to trigger the process again.

Figure 8:
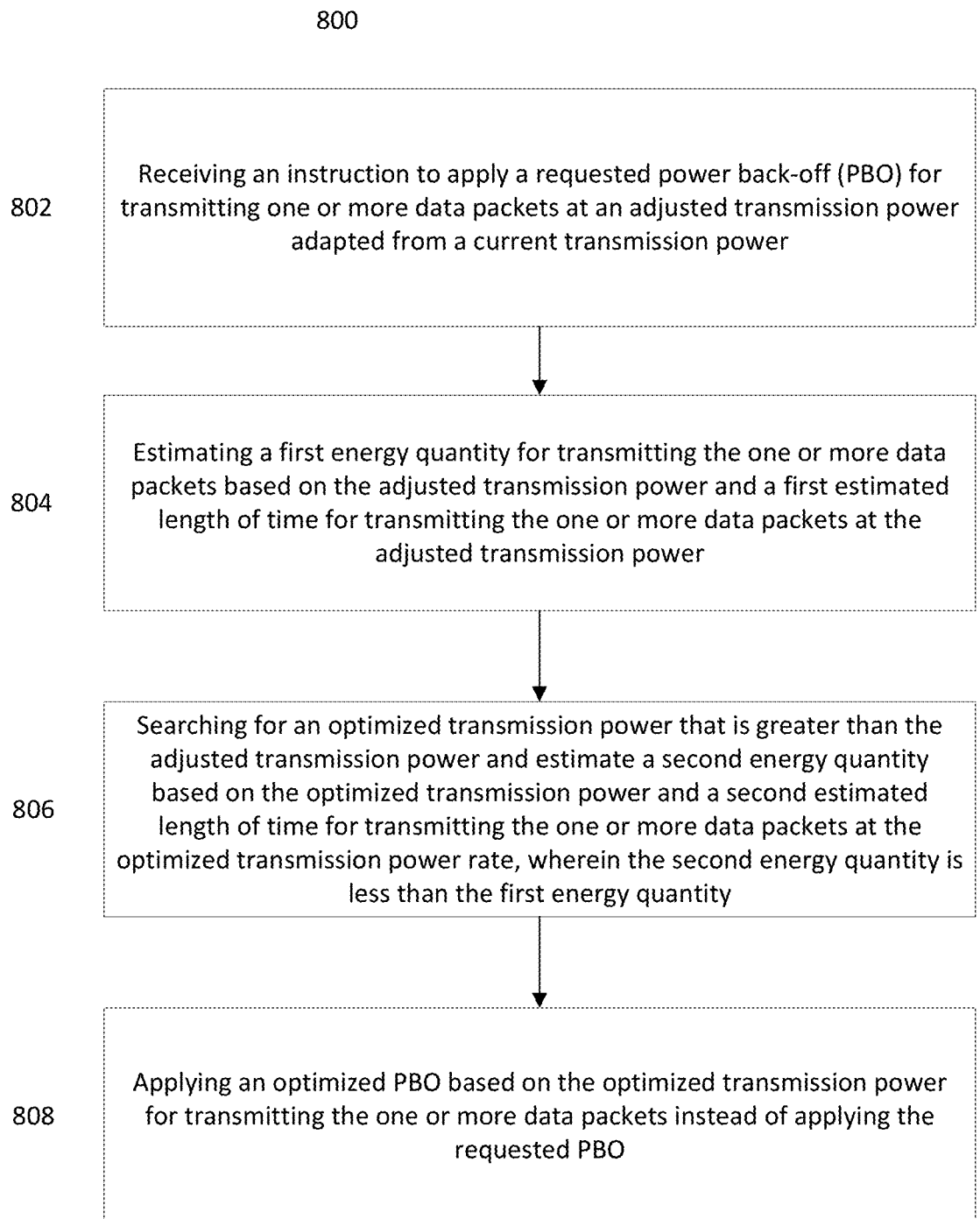
FIG. 8 exemplarily shows a flowchart according to some aspects.

FIG. 8 shows a flowchart 800 illustrating a method according to some aspects. It is appreciated that flowchart 800 is exemplary in nature and may therefore be simplified for purposes of this explanation.

The method may include receiving an instruction to apply a requested power back-off (PBO) for transmitting a data packet at an adjusted transmission power adapted from a current transmission power 802; estimating a first energy quantity for transmitting the data packet based on the adjusted transmission power and a first estimated length of time for transmitting the data packet at the adjusted transmission power 804; searching for a second transmission power that is greater than the adjusted transmission power and estimate a second energy quantity based on the second transmission power and a second estimated length of time for transmitting the data packet at the second transmission power rate, where the second energy quantity is less than the first energy quantity 806; and applying a PBO based on the second transmission power for transmitting the data packet instead of applying the requested PBO 808. The method may further include other features as described herein.

Figure 9:
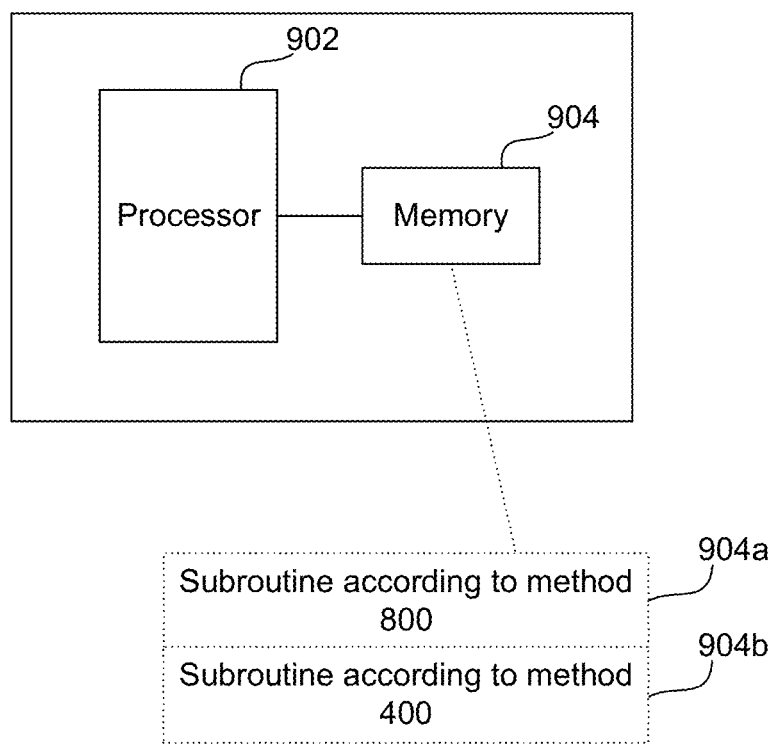
FIG. 9 exemplarily shows an internal configuration of baseband modem according to some aspects.

FIG. 9 shows an internal configuration of a baseband modem according to some aspects. As shown in FIG. 9, the terminal device may include processor(s) 902 and memory 904. Processor(s) 902 may be a single processor or multiple processors, and may be configured to retrieve and execute program code to perform the methods described herein. For example, processor(s) 902 may be included in a baseband modem and/or an application processor of the terminal device. Processor(s) 902 may transmit and receive data over a software-level connection.

Memory 904 may be a non-transitory computer readable medium storing sub-routine instructions 904a, and/or 904b. Memory 904 may be a single memory or may be multiple memories and may be included as internal memories to processor(s) 902 or may be external to processor(s) 902. Memory 904 may be a non-transitory computer readable medium storing one or more sets subroutine instructions for executing one or more of the methods described herein, e.g., methods shown in flowcharts 400 or 800.

The values stored in the FRKD may be based on calculations and/or measurements determined by one or more of the following options: real-life system measurements in differing levels of noise and/or simulation results from channel emulations of different types including Additive white Gaussian Noise (AWGN) parameters or D-channel parameters. In some aspects, the FRKD may be based on a weighted combination of these options. Additional safe margins (SafeMargins) may be added to each use case to cover variance through different use cases, environments and other receiver-side transceiver types.

The measurements and/or calculations based on the real-life system or simulations may be pre-analyzed and inserted into the FRKD 407 shown in flowchart 400.

FIG. 10 shows an exemplary illustrative explanation in the form of an annotated graph 1000 for the fixed rate knee point database (FRKD) according to some aspects. It is appreciated that graph 1000 is exemplary in nature and may thus be simplified for purposes of this explanation. For example, while graph 1000 and the description herein use RSSI values as the signal quality strength indicator (SQSI) values for purposes of the explanation, it is appreciated that other SQSI values (e.g., signal to noise ratios) may be used and are included within the scope of this disclosure as well.

Graph 1000 provides an exemplary illustration charting the throughput versus attenuation (TvA) relationship that the FRKD is based off of. The x-axis represents the signal link quality indicator, which in this case, is shown as being the RSSI and is measured in dBms. This value may be indicative of the range to the receiver device, for example. The right side of the graph (i.e., the more negative RSSI values) correspond to a higher attenuation (i.e., lower RSSI, greater distance to receiver, etc.). The y-axis represents the successful throughput, also referred to as the "goodput," which is based on the transmitted packets that are successfully detected at the receiver side.

Each of the different shaded areas shown in the graph represent a different "fixed" PHY rate, or operational rate. The term "fixed" may refer to the network interface controllers having link control functions that change rates whenever a certain rate is not performing within a required set of parameters, e.g. within a certain packet error rate (PER) threshold. The rate curves in the diagram represent measurement results from an 802.11ac setup, but it is appreciated that similar data may be measured/calculated and stored in the FRKD for other protocol or modulation coding scheme (MCS) sets. For purposes of this explanation, the right most PHY rate (i.e., the lowest shaded area to the right with dashed line 1002 intersecting it) will be termed "PHY_0" and the numbers may increase in similar fashion all the way to the left most PHY rate (i.e., the highest shaded area next to the y-axis with dashed line 1004 intersecting it), which will be termed "PHY_11". Each dashed line intersects a different PHY rate of the set.

Each PHY rate has a knee point from which the throughput degrades. The dashed line intersecting each of the PHY rates marks this knee point. The knee point can be defined based on values that represent, for each of a plurality of PHY rates, a corresponding RSSI at which the PHY rate will not be able to maintain a throughput above a predefined threshold. For example, the predefined threshold may be based on a packet error rate (PER) threshold or an error vector magnitude (EVM) threshold. In the PER case, for example, this may be set at 10% PER. In some aspects, this knee point may be defined as the point at which the throughput (TpT) starts to decrease at a certain rate monotonically.

In other words, for each fixed PHY rate, a minimum beacon-RSSI value may be saved to the FRKD that represents the attenuation from which the throughput starts to degrade rapidly in a linear fashion. For a given setup that locates the device before the application of any attenuation to ensure a good dynamic range, the minimum-beacon RSSI may be the RSSI that will cause a very low packet error rate (PER). This data may be termed as the "RateMinRSSI." The knee point measurement may be based on any one or more of the following options: (1) real system measurements where a fixed-rate throughout vs attenuation [TvA] provides the knee point of attenuation were the TpT starts to degrade (e.g., 10% PER in Tx may represent this, but other PERs that justify a link quality rate control can also be selected); (2) by monitoring/simulating the PHY constellation error-vectormagnitude (EVM), and setting a limit on it; (3) by monitoring/simulating the PHY error-correction-code (ECC) status that may indicate the number of error bits (either corrected or unrecovered); or (4) any combination of the above.

PHY_0 (i.e., the right most shaded area intersected by 1002) represents the lowest rate the PHY can operate in. When this rate is no longer sustainable, the throughput may fall of to zero. This rate corresponds to the lowest rate of the operational rates as used herein. Each of the knee points (i.e., the RSSI values of each of the PHY rates) may be stored in the FRKD, and is represented by the RSSI (RateMinRSSI) at each rate. This maybe based, for example, on a particular MCS.

Furthermore, as shown in graph 1000, the rate-to-rate knee margin (R2RKM) values that can be stored in rate-to-rate-knee margin table (R2RKMT) 409 are illustrated. The gap between each two neighboring knee points are the value stored in the R2RKMT. For example, the R2RKM value for PHY_11 and PHY_10 and also the R2RKM value for PHY_1 and PHY_0 are illustrated.

While the values stored in FRKD defined above may dependent on the channel frequency used, in some aspects, the FRKD may include values stored for each channel frequency. In other aspects, the stored values representing the knee points may be minimized to be mutual for all channels, or for a group of channels by selecting a minimum attenuation over all supported channels. In other aspects, one type can be stored in the FRKB and a factor vector can be added to cover other channel types from the same database.

Similarly, while values stored in the FRKD defined above may be dependent on channel bandwidth used, in some aspects, the FRKD may include values stored for each channel bandwidth. In other aspects, the stored values representing the knee points may be minimized to be mutual for all channel bandwidths, or for a group of channel bandwidths by selecting the minimum attenuation over all channel bandwidths. In other aspects, one type can be stored in FRKD and a factor vector can be added to cover other channel bandwidth types from the same database.

Similarly, while values stored in the FRKD defined above may be dependent on different antenna diversity types or RF chain configurations (e.g., single/multiple PHY/RF/antenna chain mechanisms such as single input single output (SISO), multiple input multiple output (MIMO), space-time block coding (STBC), PHY beamforming, R beamforming) the FRKD may include values stored for each antenna diversity type or RF chain configuration. In other aspects, the stored values representing the knee points may be minimized to be mutual for all antenna diversity types or RF chain configurations, or for a group of antenna diversity types or RF chain configurations by selecting the minimum attenuation over all antenna diversity types or RF chain configurations. In other aspects, one type can be stored in FRKD and a factor vector can be added to cover other antenna diversity types or RF chain configurations from the same database.

Similarly, while values stored in the FRKD defined above may be dependent on PHY modulation types used, such as CCK/OFDM, in some aspects, the FRKD may include values stored for each PHY modulation type. In other aspects, the stored values representing the knee points may be minimized to be mutual for all PHY modulation types, or for a group of PHY modulation types by selecting the minimum attenuation over all antenna diversity types or RF chain configurations. In other aspects, one type can be stored in FRKD and a factor vector can be added to cover other PHY modulation types from the same database.

FIG. 11 shows an example case illustrating the method of this disclosure utilizing FIG. 10. It is appreciated that this is exemplary in nature and may therefore be simplified for purposes of this explanation.

In this example case, the current operational rate (cRate) is represented by line 1102, corresponds to a PHY_11. The cRate is the PHY rate (operational rate) at which the system is currently working at before any TAS back-off (BO) is applied. Its corresponding signal quality indicator value, in this example, is as cRSSI and is approximately −43 dBms. Line 1104 represents the rate that the requested PBO (rPBO) from the TAS mechanism would fall to if the rPBO would have been applied. In other words, line 1104 corresponds to the adjusted operational rate (rPBOrate) which, in this example, is PHY_3. Its corresponding RSSI value is equal to cRSSI-rPBO.

Line 1106 represents the second PBO rate (sPBOrate), or the second operational rate, that would be implemented by the methods of this disclosure. In this example, this corresponds to PHY_7 and its RSSI is equal to cRSSI-sPBO. The rate-fall-safe margin (RFSmargin) for the sPBOrate is also shown 1108. The sPBO may be computed by sPBO=cRSSI−(sRSSI+RFSmargin).

In some aspects, the features shown in FIG. 6 may be described as follows. The initial LoopRate is set to one rate higher than the rPBOrate, i.e., in this example, the initial LoopRate is set to PHY_4. In each iteration of the loop, the next highest PHY rate is utiltized in searching for the sPBOrate until one that provides a PBOpacketEnergy less than the rPBOPacket Energy is determined. In the example shown in FIG. 11, this corresponds to an sPBOrate of PHY_7 with the corresponding sRSSI, where the RFS margin is added to the knee point value of PHY_7 to obtain the sPBOrate.

It is appreciated that the method and devices disclosed herein provide mechanism s to search for a second PBO in response to a requested PBO. If a second PBO is not determined according to the methods of this disclosure, then the requested PBO may be applied.

The following examples pertain to further aspects of this disclosure:

Example 1 is a device including one or more processors configured to: receive an instruction to apply a requested power back-off (PBO) for transmitting one or more data packets at an adjusted transmission power adapted from a current transmission power; estimate a first energy quantity for transmitting the one or more data packets based on the adjusted transmission power and a first estimated length of time for transmitting the one or more data packets at the adjusted transmission power; determine the second transmission power that is greater than the adjusted transmission power and estimate a second energy quantity based on the second transmission power and a second estimated length of time for transmitting the one or more data packets at the second transmission power, where the second energy quantity is less than the first energy quantity; and apply the second PBO based on the second transmission power for transmitting the one or more data packets instead of applying the requested PBO. In some aspects, the second energy quantity is for the same packet size as the first energy quantity (i.e., the rPBO energy).

In Example 2, the subject matter of Example(s) 1 may include where estimating the first energy quantity includes computing a channel state signal quality strength indicator (SQSI) bias based on a current operational rate and its associated SQSI, where the current operational rate is based on the current transmission power. In some aspects, the SQSI may be a RSSI and may be required to calibrate the FRKD to the real current channel state.

In Example 3, the subject matter of Example(s) 2 may include where computing the channel state SQSI bias includes applying a first PBO with a first PBO value, waiting for a modified operational rate to stabilize in response to the first PBO, and determining whether the modified operational rate is lower than the current operational rate.

In Example 4, the subject matter of Example(s) 3 may include where, based on the modified operational rate being lower than the current operational rate, the one or more processors are configured to compute a current operational rate knee point by computing a difference of the first PBO value from the associated SQSI.

In Example 5, the subject matter of Example(s) 3 may include where, based on the modified operational rate being greater than or equal to the current operational rate, the one or more processors are configured to apply a series of secondary PBOs with respective PBO values greater than the first PBO value until a secondary PBO value of the series of secondary PBOs that induces a lower operational rate than the current operational rate is determined, and compute a current operational rate knee point by computing a difference of the secondary PBO from the associated SQSI.

In Example 6, the subject matter of Example(s) 4-5 may include where the one or more processors are configured to compute the channel state SQSI bias by subtracting a fixed rate knee point from the current operational rate knee point, where the fixed rate knee point is obtained from a fixed rate knee point database based on the current operational rate.

In Example 7, the subject matter of Example(s) 6 may include where the fixed rate knee point database includes values that represent, for each of a plurality of operational rates, a corresponding SQSI that a respective operational rate of the plurality of operational rates will not be able to maintain a throughput above a predefined threshold.

In Example 8, the subject matter of Example(s) 7 may include where the predefined threshold is based on a packet error rate (PER) threshold or an error vector magnitude (EVM) threshold. In some aspects, a combination of the PER and throughput or any other threshold based on the transmission link quality control algorithms may be utilized.

In Example 9, the subject matter of Example(s) 2-8 may include where the one or more processors are configured to estimate the first energy quantity includes by determining a knee point SQSI of the current operational rate.

In Example 10, the subject matter of Example(s) 9 may include where the one or more processors are configured to determine the SQSI knee point of the current operational rate by subtracting the channel state SQSI bias from the knee point SQSI.

In Example 11, the subject matter of Example(s) 1-10 may include where the requested PBO is based on meeting a specific absorption rate (SAR) averaging limit for transmission energy over a time window. In some aspects, the requested PBO may be based on any TAS requested PBO value.

In Example 12, the subject matter of Example(s) 9-11 may include where the one or more processors are configured to determine an adjusted operational rate corresponding to the adjusted transmission power based on the requested PBO, the current operational rate and its associated SQSI, and the current operational rate knee point.

In Example 13, the subject matter of Example(s) 12 may include where a value of the current operational rate knee point is subtracted from a value of the associated SQSI of the current operational rate to provide a first difference, and the first difference is subtracted from the requested PBO to align the requested PBO to a knee point value. In some aspects, the first difference may be needed to calibrate the database.

In Example 14, the subject matter of Example(s) 13 may include where, based on the knee point value that the requested PBO is aligned to being less than or equal to zero, the one or more processors are configured to set the value of the adjusted operational rate equal to the current operational rate.

In Example 15, the subject matter of Example(s) 13-14 may include where, based on the knee point value that the requested PBO is aligned to being greater than zero, the one or more processors are configured to determine an adjusted knee point value from a rate-to-rate knee margin table based on margins between each of the plurality of knees of the fixed rate knee point database.

In Example 16, the subject matter of Example(s) 15 may include where the one or more processors are configured to search the rate-to-rate knee margin table, starting from a value of the current operational rate knee point, to find a first next margin that is greater than or equal to the knee point value that the requested PBO is aligned to, mark the first next margin's greater operational rate, return a lower operational rate value one rate lower than the first next margin's greater operational rate, and set the lower operational rate value as the adjusted transmission power rate.

In Example 17, the subject matter of Example(s) 12-16 may include where the first energy quantity is determined by multiplying the adjusted transmission power by the first estimated length of time, where the first estimated length of time an over the air time is determined based on a size of the one or more data packets divided by the adjusted operational rate.

In Example 18, the subject matter of Example(s) 12-17 may include where the one or more processors are configured to calculate a packet size of the one or more data packets according to the adjusted operational rate and a maximum data packet time. In some aspects, the packet size is calculated by the rPBO (requested power by TAS), and once this packet size is known, it may be used as a baseline to calculate and find a higher rate (achieved by smaller PBO) that will use less total energy to Tx the same packet size.

In Example 19, the subject matter of Example(s) 17-18 may include where determining the second transmission power includes determining the second operational rate based on a packet size that will result in the second energy quantity being less than the first energy quantity.

In Example 20, the subject matter of Example(s) 19 may include where the one or more processors configured to implement a loop for determining the second operational rate, the loop including: starting from the adjusted operational rate, in a first iteration of the loop, selecting an operational rate one step lower than the adjusted operational rate, and for each subsequent iteration of the loop, selecting an operational rate one step lower than the operational rate selected in the preceding iteration; calculating a corresponding transmission power for the selected operational rate of the respective iteration based on the channel state SQSI bias, a knee point corresponding to the selected operational rate of the respective iteration from the fixed rate knee point database, and a rate-fall-safe-margin; calculating a corresponding over the air packet time based on the calculated packet size of the one or more data packets according to the adjusted operational rate and the maximum data packet time divided by the selected operational rate of the respective iteration; determining a corresponding packet energy of the respective iteration by multiplying the corresponding transmission power for the selected operational rate of the respective iteration by the corresponding over the air packet time; and comparing the corresponding packet energy of the respective iteration to the first energy quantity, where: if the corresponding packet energy of the respective iteration of the loop is less than or equal to the first energy quantity, setting the selected operational rate of the respective iteration as the second operational rate, or if the corresponding packet energy of the respective iteration of the loop is greater than the first energy quantity, repeating the loop with a subsequent iteration.

In Example 21, the subject matter of Example(s) 20 may include where the rate-fall-safe-margin includes a margin above a corresponding knee point that ensures than the corresponding knee point will not be crossed by deviation errors.

In Example 22, the subject matter of Example(s) 19-21 may include where the one or more processors configured to calculate the second PBO corresponding to the second operational rate.

In Example 23, the subject matter of Example(s) 22 may include where the calculation of the second PBO includes searching the fixed rate knee point database for the second SQSI knee point value corresponding to the second operational rate.

In Example 24, the subject matter of Example(s) 23 may include the one or more processors configured to calculate the second PBO by subtracting a sum of the second SQSI knee point value and the rate-fall-safe-margin from the associated SQSI of the current operational rate.

In Example 25, the subject matter of Example(s) 1-24 may include where the one or more processors configured to apply the second PBO to a transmission power controller that controls a transmitter operably coupled to the one or more processors.

In Example 26, the subject matter of Example(s) 25 may include where the one or more processors configured to bypass a transmission link control rate adaptation statistic gathering mechanism of the transmission power controller.

In Example 27, the subject matter of Example(s) 25-26 may include where, based on the second PBO being different from the requested PBO, the one or more processors are configured to: keep a size of the one or more data packets the same as they would have been if they had been transmitted with the requested PBO; or add a time back-off (TBO) in an amount corresponding to energy of that transmitting the one or more data packets at the second operational rate saved compared to the adjusted operational rate.

In Example 28, the subject matter of Example(s) 27 may include where adding the TBO includes: determining the second packet size of the one or more data packets transmitted with the second operational rate; determining a size difference in the second packet size with the size of the one or more data packets the same as they would have been if they had been transmitted with the requested PBO; and calculating the TBO based on dividing the size difference by the second operational rate.

Example 29 is a device including: a receiver configured to receive an instruction to apply a requested power back-off (PBO) for transmitting one or more data packets at an adjusted transmission power adapted from a current transmission power; an estimator configured to estimate a first energy quantity for transmitting the one or more data packets based on the adjusted transmission power and a first estimated length of time for transmitting the one or more data packets at the adjusted transmission power; a determiner configured to determine the second transmission power that is greater than the adjusted transmission power and estimate a second energy quantity based on the second transmission power and a second estimated length of time for transmitting the one or more data packets at the second transmission power, where the second energy quantity is less than the first energy quantity; and an applier configured to apply the second PBO based on the second transmission power for transmitting the one or more data packets instead of applying the requested PBO. The device may also include components to perform the features recited in Examples 2-28.

Example 30 is a device including means to receive an instruction to apply a requested power back-off (PBO) for transmitting one or more data packets at an adjusted transmission power adapted from a current transmission power; means to estimate a first energy quantity for transmitting the one or more data packets based on the adjusted transmission power and a first estimated length of time for transmitting the one or more data packets at the adjusted transmission power; means to determine the second transmission power that is greater than the adjusted transmission power and estimate a second energy quantity based on the second transmission power and a second estimated length of time for transmitting the one or more data packets at the second transmission power, where the second energy quantity is less than the first energy quantity; and means to apply the second PBO based on the second transmission power for transmitting the one or more data packets instead of applying the requested PBO. The device may also include means to perform the features recited in Examples 2-28.

Example 31 is a method including: receiving an instruction to apply a requested power back-off (PBO) for transmitting one or more data packets at an adjusted transmission power adapted from a current transmission power; estimating a first energy quantity for transmitting the one or more data packets based on the adjusted transmission power and a first estimated length of time for transmitting the one or more data packets at the adjusted transmission power; determining the second transmission power that is greater than the adjusted transmission power and estimating a second energy quantity based on the second transmission power and a second estimated length of time for transmitting the one or more data packets at the second transmission power, where the second energy quantity is less than the first energy quantity; and applying the second PBO based on the second transmission power for transmitting the one or more data packets instead of applying the requested PBO.

In Example 32, the subject matter of Example(s) 31 may include where estimating the first energy quantity includes computing a channel state signal quality strength indicator (SQSI) bias based on a current operational rate and its associated SQSI, where the current operational rate is based on the current transmission power. In some aspects, the SQSI may be a RSSI and may be required to calibrate the FRKD to the real current channel state.

In Example 33, the subject matter of Example(s) 32 may include where computing the channel state SQSI bias includes applying a first PBO with a first PBO value, waiting for a modified operational rate to stabilize in response to the first PBO, and determining whether the modified operational rate is lower than the current operational rate.

In Example 34, the subject matter of Example(s) 33 may include where, based on the modified operational rate being lower than the current operational rate, further including computing a current operational rate knee point by computing a difference of the first PBO value from the associated SQSI.

In Example 35, the subject matter of Example(s) 33 may include where, based on the modified operational rate being greater than or equal to the current operational rate, further including applying a series of secondary PBOs with respective PBO values greater than the first PBO value until a secondary PBO value of the series of secondary PBOs that induces a lower operational rate than the current operational rate is determined, and compute a current operational rate knee point by computing a difference of the secondary PBO from the associated SQSI.

In Example 36, the subject matter of Example(s) 34-35 may include computing the channel state SQSI bias by subtracting a fixed rate knee point from the current operational rate knee point, where the fixed rate knee point is obtained from a fixed rate knee point database based on the current operational rate.

In Example 37, the subject matter of Example(s) 36 may include where the fixed rate knee point database includes values that represent, for each of a plurality of operational rates, a corresponding SQSI that a respective operational rate of the plurality of operational rates will not be able to maintain a throughput above a predefined threshold.

In Example 38, the subject matter of Example(s) 37 may include where the predefined threshold is based on a packet error rate (PER) threshold or an error vector magnitude (EVM) threshold. In some aspects, a combination of the PER and throughput or any other threshold based on the transmission link quality control algorithms may be utilized.

In Example 39, the subject matter of Example(s) 32-38 may include estimating the first energy quantity includes by determining a knee point SQSI of the current operational rate.

In Example 40, the subject matter of Example(s) 39 may include determining the SQSI knee point of the current operational rate by subtracting the channel state SQSI bias from the knee point SQSI.

In Example 41, the subject matter of Example(s) 31-40 may include where the requested PBO is based on meeting a specific absorption rate (SAR) averaging limit for transmission energy over a time window. In some aspects, the requested PBO may be based on any TAS requested PBO value.

In Example 42, the subject matter of Example(s) 39-41 may include determining an adjusted operational rate corresponding to the adjusted transmission power based on the requested PBO, the current operational rate and its associated SQSI, and the current operational rate knee point.

In Example 43, the subject matter of Example(s) 42 may include where a value of the current operational rate knee point is subtracted from a value of the associated SQSI of the current operational rate to provide a first difference, and the first difference is subtracted from the requested PBO to align the requested PBO to a knee point value. In some aspects, the first difference may be needed to calibrate the database.

In Example 44, the subject matter of Example(s) 43 may include where, based on the knee point value that the requested PBO is aligned to being less than or equal to zero, further including setting the value of the adjusted operational rate equal to the current operational rate.

In Example 45, the subject matter of Example(s) 43-44 may include where, based on the knee point value that the requested PBO is aligned to being greater than zero, further including determining an adjusted knee point value from a rate-to-rate knee margin table based on margins between each of the plurality of knees of the fixed rate knee point database.

In Example 46, the subject matter of Example(s) 45 may include searching the rate-to-rate knee margin table, starting from a value of the current operational rate knee point, to find a first next margin that is greater than or equal to the knee point value that the requested PBO is aligned to, mark the first next margin's greater operational rate, return a lower operational rate value one rate lower than the first next margin's greater operational rate, and set the lower operational rate value as the adjusted transmission power rate.

In Example 47, the subject matter of Example(s) 42-46 may include where the first energy quantity is determined by multiplying the adjusted transmission power by the first estimated length of time, where the first estimated length of time an over the air time is determined based on a size of the one or more data packets divided by the adjusted operational rate.

In Example 48, the subject matter of Example(s) 42-47 may include calculating a packet size of the one or more data packets according to the adjusted operational rate and a maximum data packet time. In aspects, the packet size is calculated by the rPBO (requested power by TAS), and once this packet size is known, it may be used as a baseline to calculate and find a higher rate (achieved by smaller PBO) that will use less total energy to Tx the same packet size.

In Example 49, the subject matter of Example(s) 47-48 may include where determining the second transmission power includes determining the second operational rate based on a packet size that will result in the second energy quantity being less than the first energy quantity.

In Example 50, the subject matter of Example(s) 49 may include implementing a loop for determining the second operational rate, the loop including: starting from the adjusted operational rate, in a first iteration of the loop, selecting an operational rate one step lower than the adjusted operational rate, and for each subsequent iteration of the loop, selecting an operational rate one step lower than the operational rate selected in the preceding iteration; calculating a corresponding transmission power for the selected operational rate of the respective iteration based on the channel state SQSI bias, a knee point corresponding to the selected operational rate of the respective iteration from the fixed rate knee point database, and a rate-fall-safe-margin; calculating a corresponding over the air packet time based on the calculated packet size of the one or more data packets according to the adjusted operational rate and the maximum data packet time divided by the selected operational rate of the respective iteration; determining a corresponding packet energy of the respective iteration by multiplying the corresponding transmission power for the selected operational rate of the respective iteration by the corresponding over the air packet time; and comparing the corresponding packet energy of the respective iteration to the first energy quantity, where: if the corresponding packet energy of the respective iteration of the loop is less than or equal to the first energy quantity, setting the selected operational rate of the respective iteration as the second operational rate, or if the corresponding packet energy of the respective iteration of the loop is greater than the first energy quantity, repeating the loop with a subsequent iteration.

In Example 51, the subject matter of Example(s) 50 may include where the rate-fall-safe-margin includes a margin above a corresponding knee point that ensures than the corresponding knee point will not be crossed by deviation errors.

In Example 52, the subject matter of Example(s) 49-51 may include calculating the second PBO corresponding to the second operational rate.

In Example 53, the subject matter of Example(s) 52 may include where the calculation of the second PBO includes searching the fixed rate knee point database for the second SQSI knee point value corresponding to the second operational rate.

In Example 54, the subject matter of Example(s) 53 may include calculating the second PBO by subtracting a sum of the second SQSI knee point value and the rate-fall-safe-margin from the associated SQSI of the current operational rate.

In Example 55, the subject matter of Example(s) 31-54 may include applying the second PBO to a transmission power controller that controls a transmitter operably coupled to the one or more processors.

In Example 56, the subject matter of Example(s) 55 may include bypassing a transmission link control rate adaptation statistic gathering mechanism of the transmission power controller.

In Example 57, the subject matter of Example(s) 55-56 may include where, based on the second PBO being different from the requested PBO, further including: keeping a size of the one or more data packets the same as they would have been if they had been transmitted with the requested PBO; or adding a time back-off (TBO) in an amount corresponding to energy of that transmitting the one or more data packets at the second operational rate saved compared to the adjusted operational rate.

In Example 58, the subject matter of Example(s) 57 may include where adding the TBO includes: determining the second packet size of the one or more data packets transmitted with the second operational rate; determining a size difference in the second packet size with the size of the one or more data packets the same as they would have been if they had been transmitted with the requested PBO; and calculating the TBO based on dividing the size difference by the second operational rate.

Example 59 is one more non-transitory computer-readable media storing instructions thereon that, when executed by at least one processor of a terminal device, direct the terminal device to perform a method according to any one of examples 31-58.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc. Also, it is appreciated that particular implementations of hardware and/or software components are merely illustrative, and other combinations of hardware and/or software that perform the methods described herein are within the scope of the disclosure.

It is appreciated that implementations of methods detailed herein are exemplary in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes which come within the meaning and range of equivalency of the claims are therefore intended to be embraced.

What is claimed is:

1. A device comprising a processor configured to:
receive an instruction to apply a requested power back-off (PBO) for transmitting a data packet at an adjusted transmission power adapted from a current transmission power;
estimate a first energy quantity for transmitting the data packet based on the adjusted transmission power and a first estimated length of time for transmitting the data packet at the adjusted transmission power;
determine a second transmission power that is greater than the adjusted transmission power and estimate a second energy quantity for transmitting the data packet at the second transmission power based on the second transmission power and a second estimated length of time, wherein the second energy quantity is less than the first energy quantity; and
apply a second PBO based on the second transmission power for transmitting the data packet instead of applying the requested PBO.

2. The device of claim 1, wherein estimating the first energy quantity comprises computing a channel state signal quality strength indicator (SQSI) bias based on a current operational rate and its associated SQSI, wherein the current operational rate is based on the current transmission power.

3. The device of claim 2, wherein estimating the first energy quantity further comprises determining a knee point signal quality strength indicator (SQSI) of the current operational rate, wherein the knee point SQSI indicates a value from which the current operational rate will not be able to maintain a throughput above a predefined threshold.

4. The device of claim 3, wherein the processor is configured to determine the knee point of the current operational rate by subtracting the channel state SQSI bias from the knee point SQSI.

5. The device of claim 3, wherein the processor is configured to determine an adjusted operational rate corresponding to the adjusted transmission power based on the requested PBO, the current operational rate and its associated SQSI, and the current operational rate knee point.

6. The device of claim 5, wherein a value of the current operational rate knee point is subtracted from a value of the associated SQSI of the current operational rate to provide a first difference, and the first difference is subtracted from the requested PBO to align the requested PBO to a knee point value.

7. The device of claim 6, wherein, based on the knee point value that the requested PBO is aligned to being greater than zero, the processor is configured to determine an adjusted knee point value from a rate-to-rate knee margin table based on margins between each of the plurality of knees of a fixed rate knee point database.

8. The device of claim 7, wherein the processor is configured to search the rate-to-rate knee margin table, starting from a value of the current operational rate knee point, to find a first next margin that is greater than or equal to the knee point value that the requested PBO is aligned to, mark the first next margin's greater operational rate, return a lower operational rate value one rate lower than the first next margin's greater operational rate, and set the lower operational rate value as the adjusted transmission power rate.

9. The device of claim 5, wherein the processor is configured to determine the first energy quantity by multiplying the adjusted transmission power by the first estimated length of time, wherein the first estimated length of time is an over the air time that is determined based on a size of the data packet divided by the adjusted operational rate.

10. The device of claim 5, wherein the processor is configured to calculate a packet size of the data packet according to the adjusted operational rate and a maximum data packet time, wherein determining the second transmission power comprises determining the second operational rate based on a packet size that will result in the second energy quantity being less than the first energy quantity.

11. The device of claim 10, wherein the processor is configured to implement a loop for determining the second operational rate, the loop comprising:
  starting from the adjusted operational rate, in a first iteration of the loop, selecting an operational rate one step lower than the adjusted operational rate, and for each subsequent iteration of the loop, selecting an operational rate one step lower than the operational rate selected in the preceding iteration;
  calculating a corresponding transmission power for the selected operational rate of the respective iteration based on the channel state SQSI bias, a knee point corresponding to the selected operational rate of the respective iteration from the fixed rate knee point database, and a rate-fall-safe-margin;
  calculating a corresponding over the air packet time based on the calculated packet size of the data packet according to the adjusted operational rate and the maximum data packet time divided by the selected operational rate of the respective iteration;
  determining a corresponding packet energy of the respective iteration by multiplying the corresponding transmission power for the selected operational rate of the respective iteration by the corresponding over the air packet time; and
  comparing the corresponding packet energy of the respective iteration to the first energy quantity, wherein:
  if the corresponding packet energy of the respective iteration of the loop is less than or equal to the first energy quantity, setting the selected operational rate of the respective iteration as the second operational rate, or
  if the corresponding packet energy of the respective iteration of the loop is greater than the first energy quantity, repeating the loop with a subsequent iteration.

12. The device of claim 11, wherein the processor is configured to calculate the second PBO corresponding to the second operational rate.

13. The device of claim 12, wherein the calculation of the second PBO comprises searching a fixed rate knee point database for the second SQSI knee point value corresponding to the second operational rate.

14. The device of claim 13, wherein the processor is configured to calculate the second PBO by subtracting a sum of the second SQSI knee point value and a rate-fall-safe-margin from the associated SQSI of the current operational rate.

15. A method comprising:
  receiving an instruction to apply a requested power back-off (PBO) for transmitting a data packet at an adjusted transmission power adapted from a current transmission power;
  estimating a first energy quantity for transmitting the data packet based on the adjusted transmission power and a first estimated length of time for transmitting the data packet at the adjusted transmission power;
  determining a second transmission power that is greater than the adjusted transmission power and estimate a second energy quantity based on the second transmission power and a second estimated length of time for transmitting the data packet at the second transmission power, wherein the second energy quantity is less than the first energy quantity; and
  applying a second PBO based on the second transmission power for transmitting the data packet instead of applying the requested PBO.

16. The method of claim 15, further comprising:
  wherein estimating the first energy quantity comprises computing a channel state signal quality strength indicator (SQSI) bias based on a current operational rate and its associated SQSI, wherein the current operational rate is based on the current transmission power; and
  wherein estimating the first energy quantity further comprises determining a knee point signal quality strength indicator (SQSI) of the current operational rate, wherein the knee point SQSI indicates a value from which the current operational rate will not be able to maintain a throughput above a predefined threshold.

17. The method of claim 16, further comprising:
  determining an adjusted operational rate corresponding to the adjusted transmission power based on the requested PBO, the current operational rate and its associated SQSI, and the current operational rate knee point.

18. The method of claim 17, further comprising:
  determining the first energy quantity by multiplying the adjusted transmission power by the first estimated length of time, wherein the first estimated length of time is an over the air time that is determined based on a size of the data packet divided by the adjusted operational rate.

19. One or more non-transitory media comprising instructions which when executed by a processor of a device, cause the device to:
  receive an instruction to apply a requested power back-off (PBO) for transmitting a data packet at an adjusted transmission power adapted from a current transmission power;
  estimate a first energy quantity for transmitting the data packet based on the adjusted transmission power and a first estimated length of time for transmitting the data packet at the adjusted transmission power;
  determine a second transmission power that is greater than the adjusted transmission power and estimate a second energy quantity based on the second transmission power and a second estimated length of time for transmitting the data packet at the second transmission power, wherein the second energy quantity is less than the first energy quantity; and apply a second PBO based on the second transmission power for transmitting the data packet instead of applying the requested PBO.

20. The one or more non-transitory media of claim 19, further comprising instructions to cause the device to estimate the first energy quantity by:

computing a channel state signal quality strength indicator (SQSI) bias based on a current operational rate and its associated SQSI, wherein the current operational rate is based on the current transmission power; and determining a knee point signal quality strength indicator (SQSI) of the current operational rate, wherein the knee point SQSI indicates a value from which the current operational rate will not be able to maintain a throughput above a predefined threshold.

* * * * *